United States Patent
Sasaki et al.

(10) Patent No.: US 7,141,357 B2
(45) Date of Patent: Nov. 28, 2006

(54) METHOD OF MANUFACTURING THIN-FILM MAGNETIC HEAD

(75) Inventors: Yoshitaka Sasaki, Milpitas, CA (US); Kazuo Ishizaki, Milpitas, CA (US); Takehiro Kamigama, Hong Kong (HK)

(73) Assignees: Headway Technologies, Ltd., Milpitas, CA (US); Sae Magnetics (H.K.) Ltd., Hong Kong (HK)

( * ) Notice: Subject to any disclaimer, the term of this patent is extended or adjusted under 35 U.S.C. 154(b) by 521 days.

(21) Appl. No.: 10/786,048

(22) Filed: Feb. 26, 2004

(65) Prior Publication Data

US 2005/0188530 A1 Sep. 1, 2005

(51) Int. Cl.
*G11B 5/127* (2006.01)
(52) U.S. Cl. .................. 430/320; 430/315; 430/319; 430/394; 29/603.07
(58) Field of Classification Search .................. None
See application file for complete search history.

(56) References Cited

U.S. PATENT DOCUMENTS 5,793,578 A 8/1998 Heim et al.

| | | |
|---|---|---|
| 6,259,583 B1 | 7/2001 | Fontana, Jr. et al. |
| 6,400,525 B1 | 6/2002 | Sasaki et al. |
| 6,410,212 B1 * | 6/2002 | Sato ........................... 430/320 |
| 2004/0060165 A1 * | 4/2004 | Sasaki ..................... 29/603.07 |

FOREIGN PATENT DOCUMENTS

JP   2000-173013 A   *   6/2000

* cited by examiner

*Primary Examiner*—John A. McPherson
(74) *Attorney, Agent, or Firm*—Oliff & Berridge, PLC

(57) ABSTRACT

A track width defining layer includes: a track width defining portion having an end located in the air bearing surface and the other end located opposite to the air bearing surface; and a wide portion coupled to the other end of the track width defining portion. The track width defining layer is formed by frame plating. A frame is formed by exposing and developing a resist layer. The step of exposing the resist layer includes: a first exposure step for forming a first latent image in the resist layer; and a second exposure step for forming a second latent image in the resist layer. The first latent image is made up of a first portion corresponding to the track width defining portion and a second portion adjoining the first portion and extending along the contour of the wide portion. The second latent image is intended for use in combination with the first latent image so as to form a latent image corresponding to the track width defining layer, and does not include a portion corresponding to the track width defining portion.

7 Claims, 17 Drawing Sheets

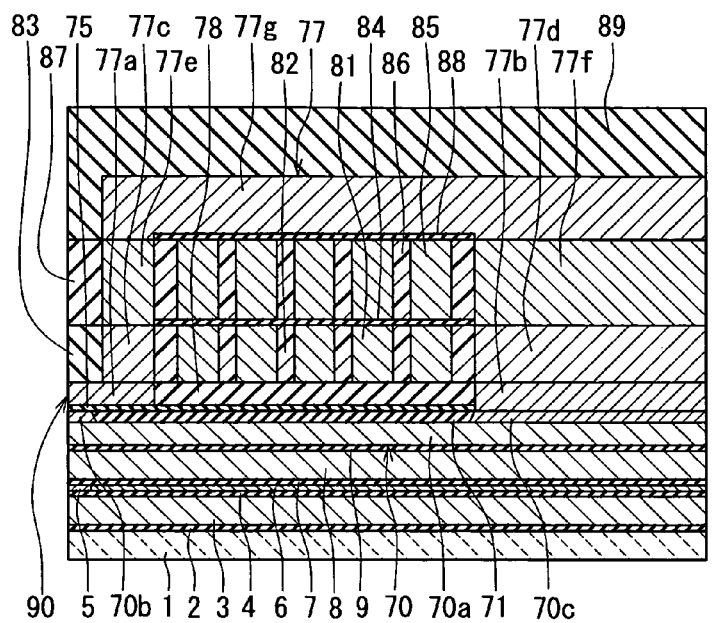
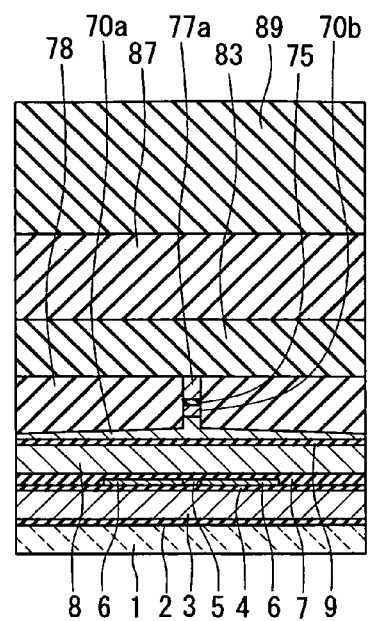
FIG. 24A
FIG. 24B

METHOD OF MANUFACTURING THIN-FILM MAGNETIC HEAD

BACKGROUND OF THE INVENTION

1. Field of the Invention

The present invention relates to a method of manufacturing a thin-film magnetic head having at least an induction-type electromagnetic transducer.

2. Description of the Related Art

Recent years have seen significant improvements in the areal recording densities of hard disk drives. In particular, the areal recording densities of latest hard disk drives have reached 100 to 160 gigabytes per platter and are even exceeding that level. It is required to improve the performance of thin-film magnetic heads, accordingly.

Among the thin-film magnetic heads, widely used are composite thin-film magnetic heads made of a layered structure including a recording (write) head having an induction-type electromagnetic transducer for writing and a reproducing (read) head having a magnetoresistive element (that may be hereinafter called an MR element) for reading.

Typically, the write head incorporates: a medium facing surface (an air bearing surface) that faces toward a recording medium; a bottom pole layer and a top pole layer that are magnetically coupled to each other and that include magnetic pole portions opposed to each other and located in regions of the pole layers on a side of the medium facing surface; a write gap layer provided between the magnetic pole portions of the top and bottom pole layers; and a thin-film coil at least part of which is disposed between the top and bottom pole layers and insulated from the top and bottom pole layers.

A higher track density on a recording medium is essential to enhancing the recording density among the performances of the write head. To achieve this, it is required to implement the write head of a narrow track structure in which the track width, that is, the width of the two magnetic pole portions opposed to each other with the write gap layer disposed in between, the width being taken in the medium facing surface, is reduced down to microns or the order of submicron. Semiconductor process techniques are utilized to achieve the write head having such a structure.

One of the parameters that affect the writing characteristics of the thin-film magnetic head is the throat height. The throat height is the length (height) of the pole portions, that is, the portions of the two pole layers opposed to each other with the write gap layer in between, as taken from the medium-facing-surface-side end to the other end. The throat height affects the intensity and distribution of the magnetic field generated near the write gap layer in the medium facing surface.

Moreover, it is required that the write head have an excellent overwrite property as a parameter indicating an overwriting capability. To improve the overwrite property, it is necessary to introduce as great a part of magnetic flux passing through the two pole layers as possible to the pole portions and to generate a large magnetic field near the write gap layer in the medium facing surface. Therefore, it is effective to increase the thickness of the pole portions and to reduce the throat height for improving the overwrite property.

As disclosed in the U.S. Pat. No. 5,793,578 as prior art, the track width and the throat height are defined by the top pole layer in many of conventional thin-film magnetic heads. In such a case, for example, the insulating layer covering the thin-film coil protrudes upward from the top surface of the write gap layer, and the throat height is defined by one of the ends of this insulating layer closer to the medium facing surface. The top pole layer includes: a track width defining portion that has an end located in the medium facing surface and that defines the track width; and a wide portion that is located farther from the medium facing surface than the track width defining portion and has a width greater than the track width. The top pole layer is formed on the write gap layer and the above-mentioned insulating layer by a method such as frame plating.

The following is a description of a method of forming the top pole layer by frame plating on the write gap layer and the insulating layer that defines the throat height as described above. In this method an electrode film is formed on the write gap layer and the insulating layer that defines the throat height. Next, a photoresist layer is formed on the electrode film. The photoresist layer is made of a positive resist in this case. Next, the photoresist layer is exposed to light having a pattern corresponding to the shape of the top pole layer. The photoresist layer is then developed. A groove corresponding to the shape of the top pole layer is thereby formed in the photoresist layer. This photoresist layer serves as a frame. Next, electroplating is performed, using the frame and feeding a current to the electrode film, to form the top pole layer in the groove.

This method has the following problem. When the photoresist layer is exposed, the light used for exposure is reflected off the electrode film. Here, the surface of the insulating layer that defines the throat height includes a portion near the medium facing surface that forms a sloped surface. As a result, part of light reflected off the electrode film disposed on this sloped surface reaches a portion of the photoresist layer corresponding to the pole portion of the top pole layer. Consequently, the portion of the photoresist layer corresponding to the pole portion of the top pole layer is exposed to not only the light having a pattern corresponding to the pole portion but also the part of light reflected off the electrode film disposed on the sloped surface. It is therefore difficult through the above-described method to form the portion of the frame corresponding to the pole portion of the top pole layer with accuracy. In particular, it is extremely difficult through the method to form the pole portion having a width of 0.05 to 0.15 micrometer ($\mu$m) and a sufficient thickness.

To solve this problem, a thin-film magnetic head has been proposed wherein a concave portion is formed in the bottom pole layer and the thin-film coil is placed in the concave portion, and the top pole layer is formed on a flat surface. In this type of head the throat height is defined by an end of the concave portion closer to the medium facing surface. This type of head is disclosed in the U.S. Pat. No. 5,793,578, the U.S. Pat. No. 6,400,525B1 and the U.S. Pat. No. 6,259,583B1, for example. This head allows the pole portion of the top pole layer to be formed with more accuracy, compared to the case in which the top pole layer is formed on the insulating layer that defines the throat height.

However, the case in which the top pole layer is formed by frame plating involves the following problem even though the top pole layer is formed on a flat surface. As described above, the top pole layer has the track width defining portion and the wide portion. To improve the overwrite property, it is desirable that the length of the track width defining portion taken in the direction orthogonal to the medium facing surface is smaller. The wide portion is much greater than the track width defining portion. Therefore, when the photoresist layer is exposed, part of light reflected off the portion of the electrode film corresponding to the wide portion reaches the neighborhood of the portion of the photoresist layer corresponding to the interface between the track width defining portion and the wide portion. As a result, there arises a problem that the neighborhood of the portion of the frame corresponding to this interface loses shape. Since reflected light broadens while travelling, disturbance to the shape of the frame is greater in the upper portion of the frame. Such disturbance to the shape of the frame results in disturbance to the shape of the neighborhood of the interface between the track width defining portion and the wide portion of the top pole layer. In particular, if the track width is small or the length of the track width defining portion taken in the direction orthogonal to the medium facing surface is small, it is difficult to define the track width with accuracy when the top pole layer loses shape as described above.

If the track width is reduced, in particular, it is required to increase the thickness of the track width defining portion to improve the overwrite property. However, since disturbance to the shape of the frame is greater in the upper portion of the frame as described above, the above-mentioned problem caused by the disturbance to the shape of the frame is more serious as the thickness of the track width defining portion is increased.

OBJECT AND SUMMARY OF THE INVENTION

It is an object of the invention to provide a method of manufacturing a thin-film magnetic head to form the track width defining layer that defines the track width with accuracy.

A thin-film magnetic head fabricated through a method of manufacturing the thin-film magnetic head of the invention comprises: a medium facing surface that faces toward a recording medium; a first pole layer and a second pole layer that are magnetically coupled to each other and that include magnetic pole portions opposed to each other and located in regions of the pole layers on a side of the medium facing surface; a gap layer provided between the pole portion of the first pole layer and the pole portion of the second pole layer; and a thin-film coil, at least part of the coil being disposed between the first and second pole layers and insulated from the first and second pole layers. One of the pole layers incorporates a track width defining layer. The track width defining layer includes: a track width defining portion having an end located in the medium facing surface and the other end located opposite to the medium facing surface; and a wide portion coupled to the other end of the track width defining portion and having a width greater than a track width.

The method of manufacturing the thin-film magnetic head of the invention comprises the steps of: forming the first pole layer; forming the thin-film coil on the first pole layer; forming the gap layer on the pole portion of the first pole layer; and forming the second pole layer on the gap layer. The step of forming one of the pole layers includes the step of forming the track width defining layer. The step of forming the track width defining layer includes the steps of: forming a resist layer; exposing the resist layer to radiant energy so as to form a latent image corresponding to the track width defining layer in the resist layer; forming a frame having a groove corresponding to the track width defining layer by developing the resist layer exposed; and forming the track width defining layer by plating using the frame.

The step of exposing the resist layer includes: a first exposure step of exposing the resist layer to radiant energy so as to form a first latent image in the resist layer; and a second exposure step of exposing the resist layer to radiant energy so as to form a second latent image in the resist layer, the second exposure step being performed before or after the first exposure step. The first latent image is made up of a first portion corresponding to the track width defining portion and a second portion adjoining the first portion and extending along at least part of a contour of the wide portion. The second latent image is intended for use in combination with the first latent image so as to form the latent image corresponding to the track width defining layer, and does not include a portion corresponding to the track width defining portion.

According to the method of the invention, the first latent image is formed through the first exposure step, the first latent image being made up of the first portion corresponding to the track width defining portion and the second portion adjoining the first portion and extending along at least part of the contour of the wide portion. According to the invention, the second latent image is formed through the second exposure step, the second latent image being intended for use in combination with the first latent image so as to form the latent image corresponding to the track width defining layer, and not including a portion corresponding to the track width defining portion.

According to the method of the invention, an amount of radiant energy per unit area applied to the resist layer in the first exposure step may be greater than an amount of radiant energy per unit area applied to the resist layer in the second exposure step.

According to the method of the invention, a portion of one of the first and second latent images may be overlaid on a portion of the other.

According to the method of the invention, the first pole layer may define the throat height, and the second pole layer may incorporate the track width defining layer. In this case, the track width defining layer may be disposed on the gap layer that is flat.

According to the method of the invention, the track width may fall within a range of 0.05 to 0.15 µm inclusive. The length of the track width defining portion taken along the direction orthogonal to the medium facing surface may fall within a range of 0.05 to 0.5 µm inclusive.

According to the method of the invention, it is possible to perform each of the first and second exposure steps under an appropriate condition and to thereby form the track width defining layer that defines the track width with accuracy.

Other and further objects, features and advantages of the invention will appear more fully from the following description.

BRIEF DESCRIPTION OF THE DRAWINGS

FIG. 24A and FIG. 24B are cross-sectional views for illustrating a thin-film magnetic head of a third embodiment of the invention.

DETAILED DESCRIPTION OF THE PREFERRED EMBODIMENTS

Embodiments of the invention will now be described in detail with reference to the accompanying drawings.

[First Embodiment]

Figure 18:
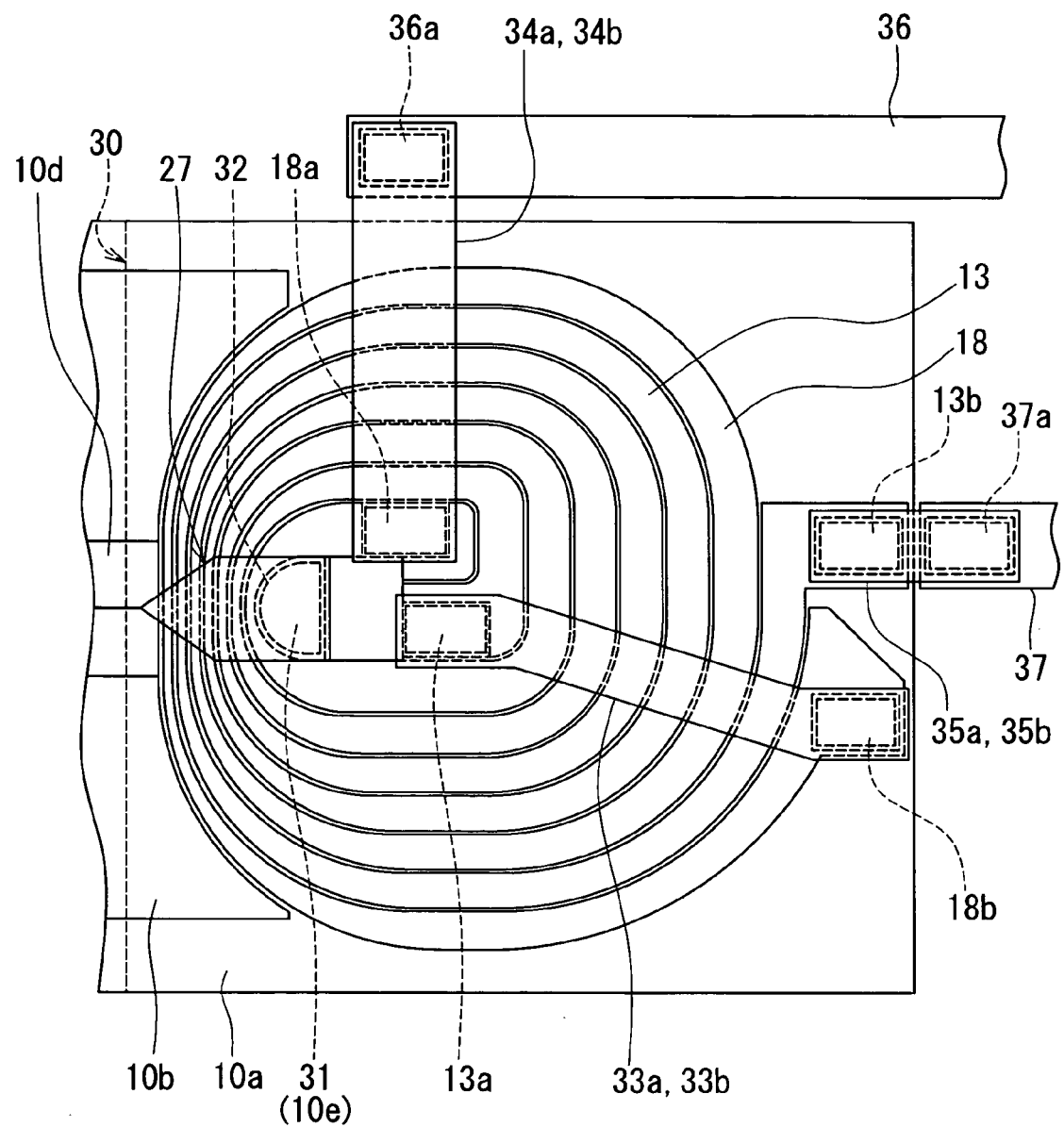
FIG. 18 is a top view of the main part of the thin-film magnetic head of the first embodiment of the invention.
Figure 19:
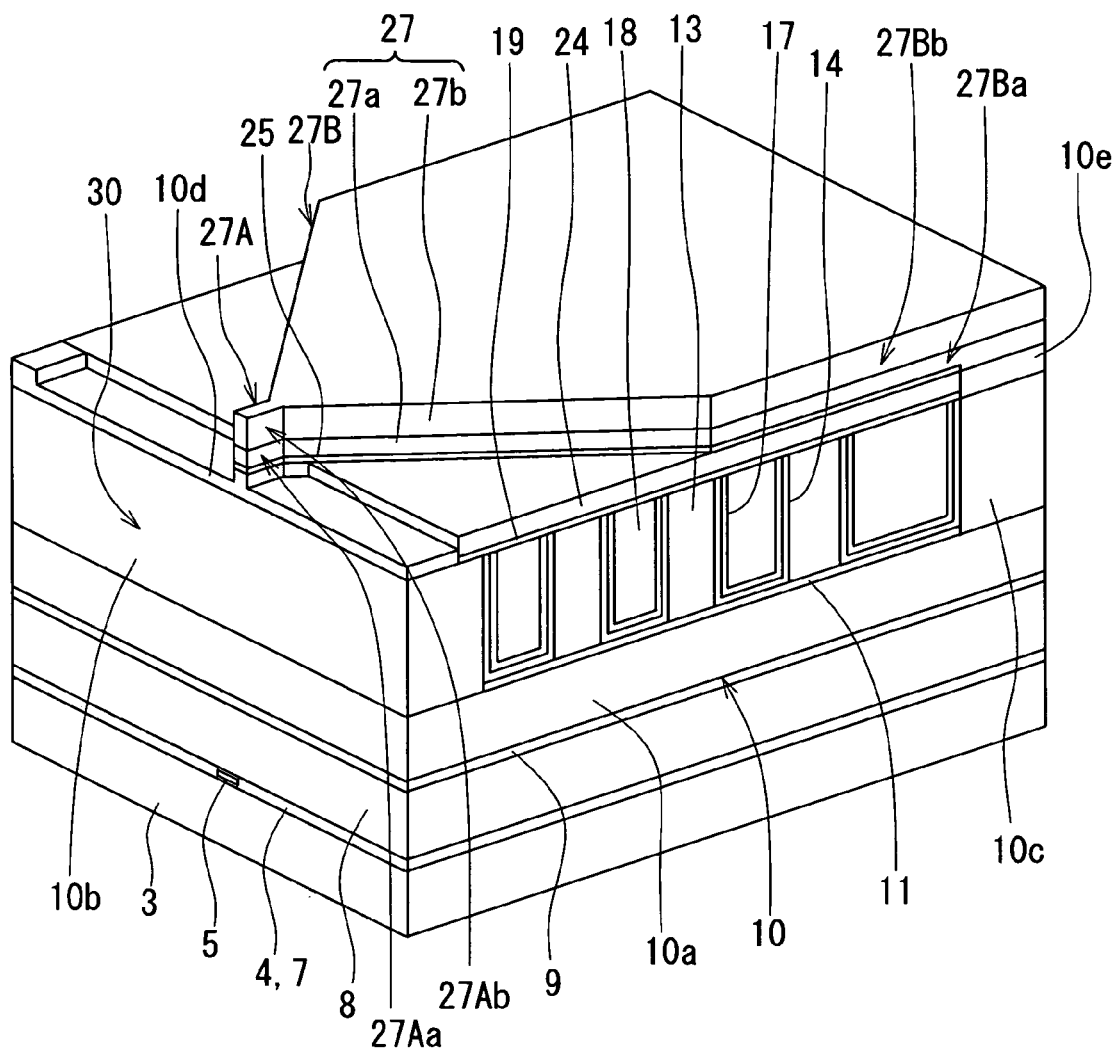
FIG. 19 is a perspective view for illustrating the configuration of the thin-film magnetic head of the first embodiment.

Reference is now made to FIG. 1A to FIG. 17A, FIG. 1B to FIG. 17B, FIG. 18 and FIG. 19 to describe a method of manufacturing a thin-film magnetic head of a first embodiment of the invention. FIG. 1A to FIG. 17A are cross sections orthogonal to the air bearing surface and the top surface of a substrate. FIG. 1B to FIG. 17B are cross sections of magnetic pole portions parallel to the air bearing surface. FIG. 18 is a top view of the main part of the thin-film magnetic head of the embodiment. FIG. 19 is a perspective view for illustrating the configuration of the thin-film magnetic head in which an overcoat layer is omitted.

Figures 1A, 1B:
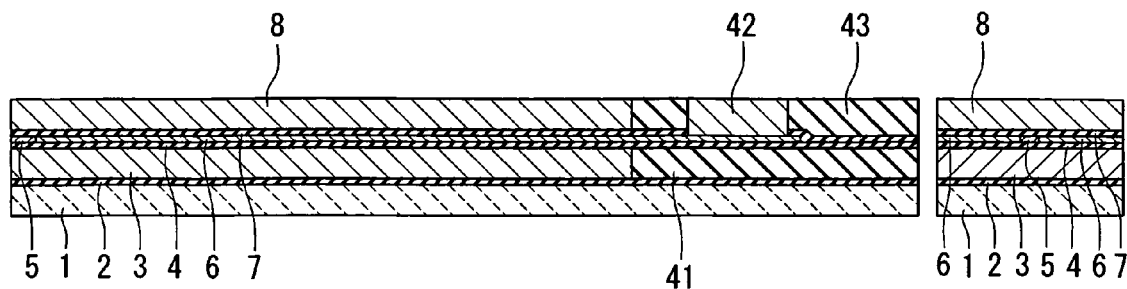
FIG. 1A and FIG. 1B are cross-sectional views for illustrating a step in a method of manufacturing a thin-film magnetic head of a first embodiment of the invention.

In the method of manufacturing the thin-film magnetic head of the embodiment, a step shown in FIG. 1A and FIG. 1B is first performed. In the step an insulating layer 2 made of alumina ($Al_2O_3$), for example, is deposited to a thickness of approximately 2 to 5 µm on a substrate 1 made of aluminum oxide and titanium carbide ($Al_2O_3$—TiC), for example. Next, a bottom shield layer 3 for a read head, made of a magnetic material such as Permalloy and having a thickness of approximately 2 to 3 µm, is formed on the insulating layer 2. The bottom shield layer 3 may be selectively formed on the insulating layer 2 by plating through the use of a photoresist film as a mask, for example. Next, an insulating layer 41 made of alumina, for example, and having a thickness of 3 to 4 µm, for example, is formed over the entire surface. The insulating layer 41 is then polished by chemical mechanical polishing (hereinafter referred to as CMP), for example, to expose the bottom shield layer 3 and to flatten the surface.

On the bottom shield layer 3, a bottom shield gap film 4 serving as an insulating film and having a thickness of approximately 20 to 40 nm, for example, is formed. On the bottom shield gap film 4, an MR element 5 for magnetic signal detection having a thickness of tens of nanometers is formed. For example, the MR element 5 may be formed by selectively etching an MR film formed by sputtering. The MR element 5 is located near a region in which the air bearing surface described later is to be formed. The MR element 5 may be an element made up of a magnetosensitive film that exhibits magnetoresistivity, such as an anisotropic magnetoresistive (AMR) element, a giant magnetoresistive (GMR) element or a tunnel magnetoresistive (TMR) element. Next, a pair of electrode layers 6, each having a thickness of tens of nanometers, to be electrically connected to the MR element 5 are formed on the bottom shield gap film 4. A top shield gap film 7 serving as an insulating film and having a thickness of approximately 20 to 40 nm, for example, is formed on the bottom shield gap film 4 and the MR element 5. The MR element 5 is embedded in the shield gap films 4 and 7. Examples of insulating materials used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, the top shield gap film 7 is selectively etched to form openings in the top shield gap film 7 on portions of the electrode layers 6 near ends thereof farther from the air bearing surface. Next, a top shield layer 8 for a read head, made of a magnetic material and having a thickness of approximately 1.0 to 1.5 µm, is selectively formed on the top shield gap film 7. At the same time, connecting layers 42 are formed on the electrode layers 6 exposed from the respective openings of the top shield gap film 7. The connecting layers 42 are made of a material the same as that of the top shield layer 8 and have a thickness the same as that of the top shield layer 8. Next, an insulating layer 43 made of alumina, for example, and having a thickness equal to or greater than the thickness of the top shield layer 8 is formed over the entire surface, and polished by CMP, for example, so that the top shield layer 8 and the connecting layers 42 are exposed, and the surface is flattened.

Figures 2A, 2B:
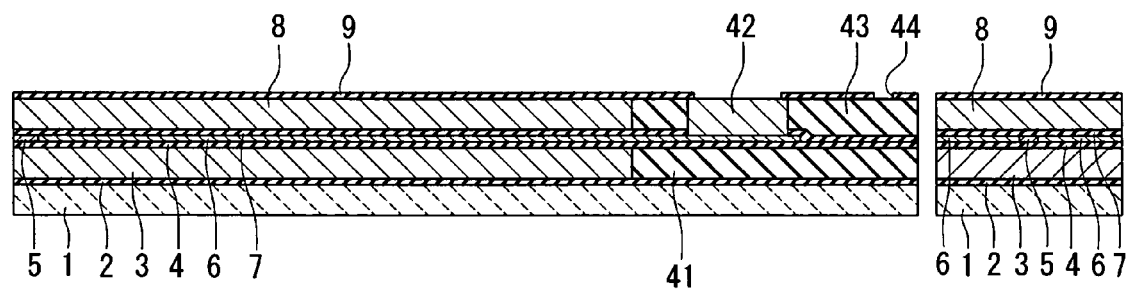
FIG. 2A and FIG. 2B are cross-sectional views for illustrating a step that follows FIG. 1A and FIG. 1B.

FIG. 2A and FIG. 2B illustrate the following step. In the step an insulating layer 9 made of alumina, for example, and having a thickness of approximately 0.15 to 0.2 µm is formed over the entire top surface of the layered structure obtained through the foregoing steps. Next, the insulating layer 9 is selectively etched to form openings in portions of the insulating layer 9 located on the connecting layers 42. At the same time, portions of the insulating layer 9 located farther from the air bearing surface than the above-mentioned openings are selectively etched to form indicators 44 in the insulating layer 9. The indicators 44 are used to align a layer that will be formed later.

Figures 3A, 3B:
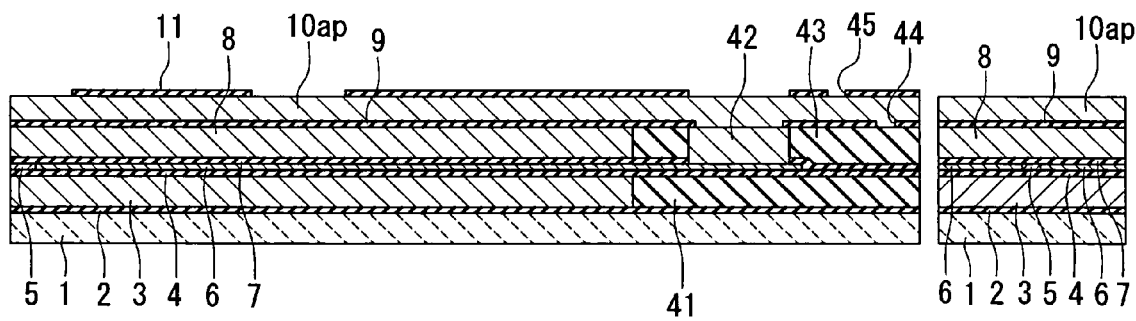
FIG. 3A and FIG. 3B are cross-sectional views for illustrating a step that follows FIG. 2A and FIG. 2B.

FIG. 3A and FIG. 3B illustrate the following step. In the step a magnetic layer 10ap made of a magnetic material and having a thickness of 0.5 to 1.0 µm, for example, is formed on the insulating layer 9. The magnetic layer 10ap will be used to form a first layer 10a of a bottom pole layer 10 that will be described later. The bottom pole layer 10 includes the first layer 10a, and a second to fifth layers 10b, 10c, 10d and 10e that will be described later.

The magnetic layer 10ap is formed by sputtering, using a high saturation flux density material such as FeAlN, FeN, FeCo, CoFeN or FeZrN. Alternatively, the magnetic layer 10ap may be formed by plating, using NiFe (80 weight % Ni and 20 weight % Fe), or a high saturation flux density material such as NiFe (45 weight % Ni and 55 weight % Fe).

Next, an insulating film 11 made of alumina, for example, and having a thickness of 0.2 µm is formed on the magnetic layer 10ap. The insulating film 11 is then selectively etched to form openings in the insulating film 11 in regions in which the second layer 10b and the third layer 10c are to be formed and in regions located on the connecting layers 42. At the same time, portions of the insulating film 11 located farther from the air bearing surface than the openings located on the connecting layers 42 are selectively etched to form indicators 45 in the insulating film 11. The indicators 45 are used to align a layer that will be formed later.

Figures 4A, 4B:
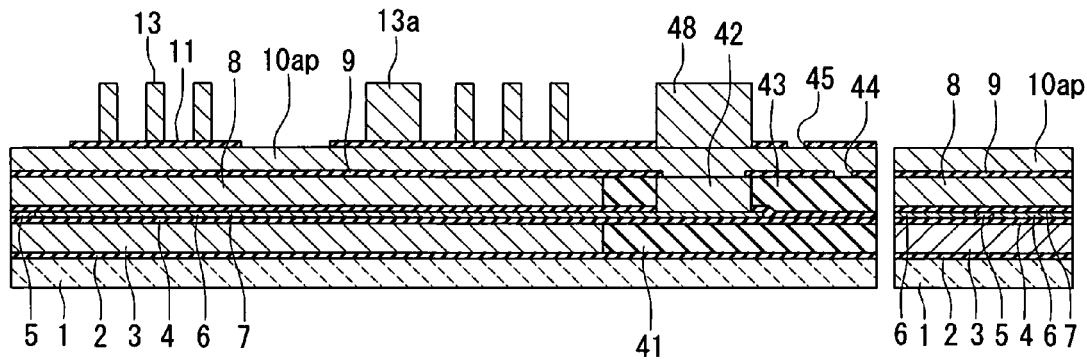
FIG. 4A and FIG. 4B are cross-sectional views for illustrating a step that follows FIG. 3A and FIG. 3B.

FIG. 4A and FIG. 4B illustrate the following step. In the step, although not shown, an electrode film of a conductive material having a thickness of 50 to 80 nm is formed by sputtering, for example, so as to cover the magnetic layer 10ap and the insulating film 11. This electrode film functions as an electrode and a seed layer for plating. Next, although not shown, a frame is formed on the electrode film by photolithography. The frame will be used for forming a first coil 13 by frame plating.

Next, electroplating is performed, using the electrode film, to form the first coil 13 made of Cu, for example, and having a thickness of approximately 2.0 to 3.0 µm. At the same time, connecting layers 48 are formed on portions of the magnetic layer 10ap located on the connecting layers 42. The connecting layers 48 are made of a material the same as that of the first coil 13 and have a thickness the same as that of the first coil 13. The first coil 13 is disposed in the region in which the insulating film 11 is located. In FIG. 4A numeral 13a indicates a connecting portion that is located near the inner end of the first coil 13 and connected to a connecting layer 33a that will be described later. Next, the frame is removed, and portions of the electrode film except the portions below the first coil 13 and the connecting layers 48 are then removed by ion beam etching, for example.

Next, although not shown, a frame is formed on the layered structure by photolithography. The frame will be used for forming the second layer 10b and the third layer 10c by frame plating.

Figures 5A, 5B:
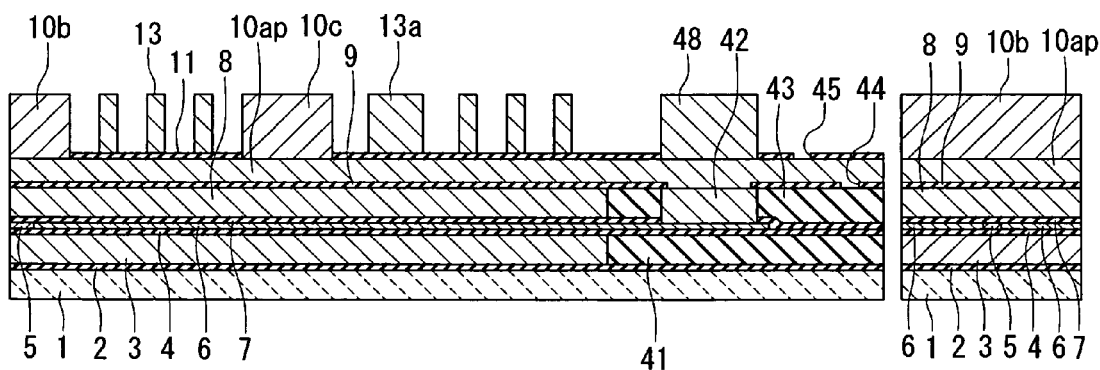
FIG. 5A and FIG. 5B are cross-sectional views for illustrating a step that follows FIG. 4A and FIG. 4B.

FIG. 5A and FIG. 5B illustrate the following step. In the step electroplating is performed to form the second layer 10b and the third layer 10c, each of which is made of a magnetic material and has a thickness of 2.5 to 3.5 µm, for example, on the magnetic layer 10ap. For example, the second layer 10b and the third layer 10c may be made of CoNiFe having a saturation flux density of 1.8 to 1.9 T (67 weight % Co, 15 weight % Ni, and 18 weight % Fe) or FeCo having a saturation flux density of 2.4 T (60 weight % Fe and 40 weight % Co). In the embodiment, when the second layer 10b and the third layer 10c are formed by plating, no specific electrode film is provided, but the unpatterned magnetic layer 10ap is used as an electrode and a seed layer for plating.

The second layer 10b is disposed near the air bearing surface. The third layer 10c is a portion for connecting the first layer 10a to a top pole layer that will be described later and is disposed near the center of the first coil 13.

Figures 6A, 6B:
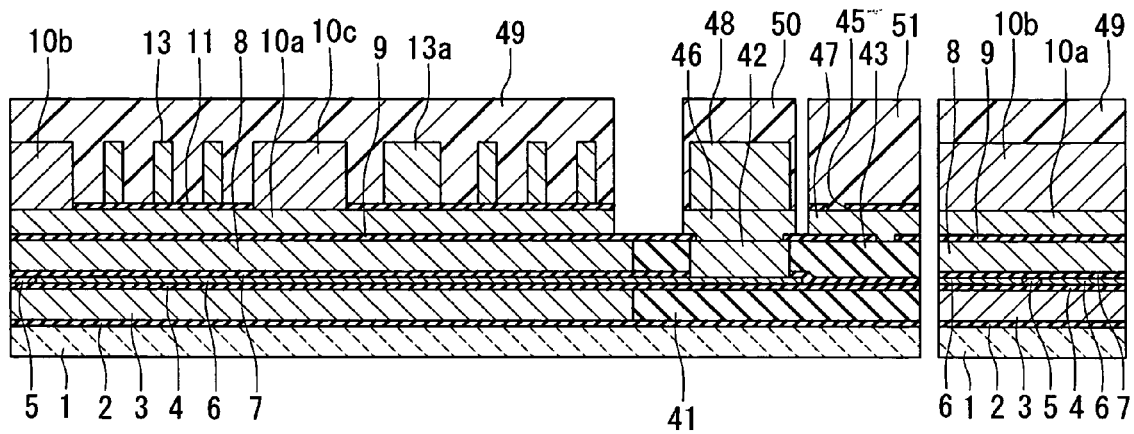
FIG. 6A and FIG. 6B are cross-sectional views for illustrating a step that follows FIG. 5A and FIG. 5B.

FIG. 6A and FIG. 6B illustrate the following step. In the step a photoresist layer 49 is formed to cover the first coil 13, the second layer 10b and the third layer 10c. A photoresist layer 50 is formed to cover the connecting layers 48. A photoresist layer 51 is formed to cover the indicators 45 and their peripheries. Using the photoresist layers 49, 50 and 51 as masks, the magnetic layer 10ap is selectively etched by ion beam etching, for example. The first layer 10a, a connecting layer 46 and a magnetic layer 47 are thereby made up of the remaining portions of the magnetic layer 10ap. The first layer 10a is formed below the photoresist layer 49. The connecting layer 46 is formed below the photoresist layer 50. The magnetic layer 47 is formed below the photoresist layer 51.

Figures 7A, 7B:
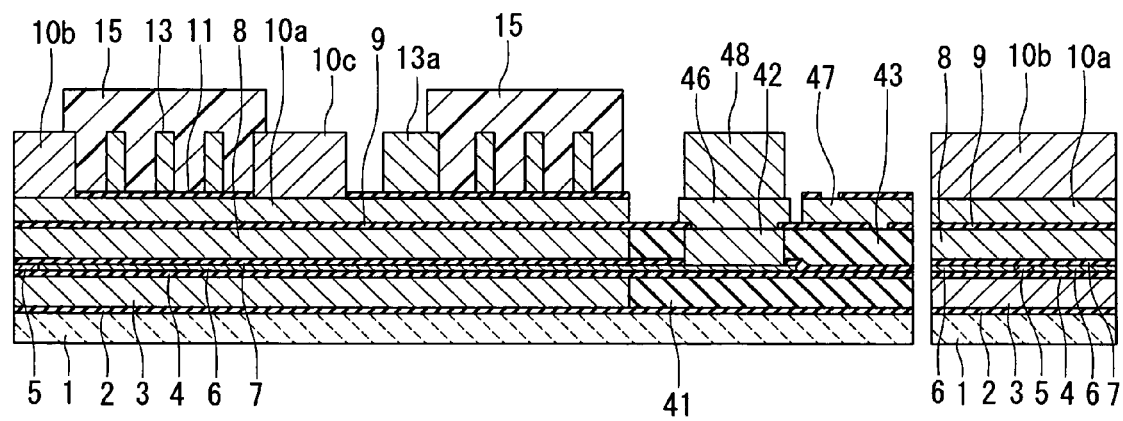
FIG. 7A and FIG. 7B are cross-sectional views for illustrating a step that follows FIG. 6A and FIG. 6B.

FIG. 7A and FIG. 7B illustrate the following step. In the step an insulating layer 15 made of photoresist, for example, is formed in a region in which a second coil described later is to be located. The insulating layer 15 is formed so that at least the space between the turns of the first coil 13 is filled with the insulating layer 15. A portion of the insulating layer 15 is disposed outside the outer periphery of the first coil 13 and inside the inner periphery of the first coil 13.

Figures 8A, 8B:
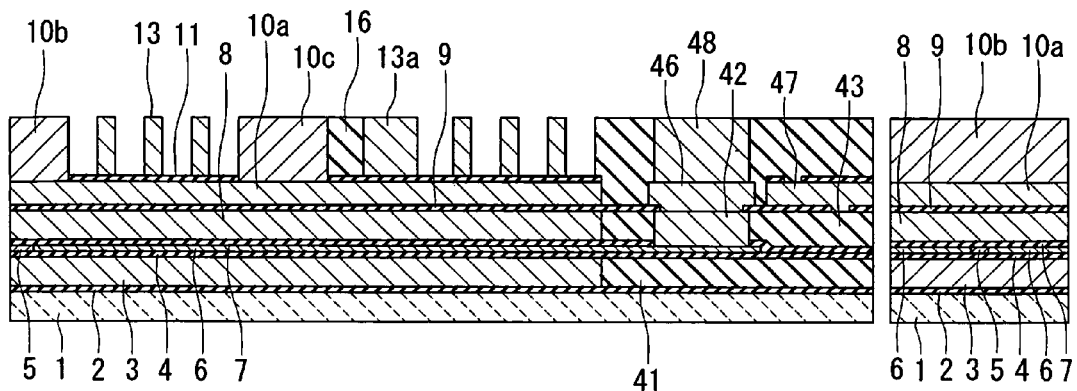
FIG. 8A and FIG. 8B are cross-sectional views for illustrating a step that follows FIG. 7A and FIG. 7B.

FIG. 8A and FIG. 8B illustrate the following step. In the step an insulating layer 16 made of alumina, for example, and having a thickness of 3 to 4 µm is formed so as to cover the insulating layer 15. Next, the insulating layers 15 and 16 are polished by CMP, for example, so that the insulating layer 15 is exposed, and the top surfaces of the insulating layers 15 and 16 are flattened. Next, the insulating layer 15 is removed.

Figures 9A, 9B:
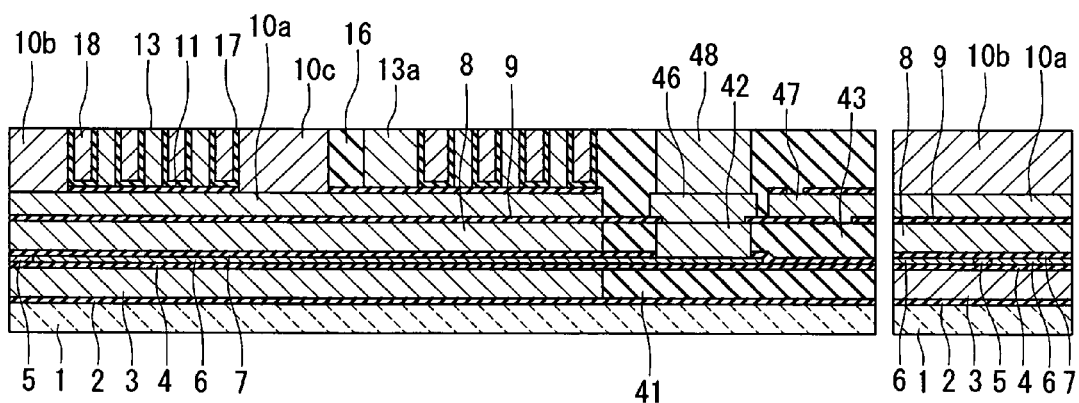
FIG. 9A and FIG. 9B are cross-sectional views for illustrating a step that follows FIG. 8A and FIG. 8B.

FIG. 9A and FIG. 9B illustrate the following step. In the step an inter-coil insulating film 17 made of alumina, for example, and having a thickness of 0.1 to 0.2 µm is formed by CVD, for example, so as to cover the entire top surface of the layered structure. Next, although not shown, an electrode film made of a conductive material is formed by sputtering, for example, to cover the entire top surface of the layered structure. The electrode film functions as an electrode and a seed layer for plating. Next, a conductive layer made of Cu, for example, and having a thickness of 3 to 4 µm, for example, is formed by plating on the electrode film. Next, the conductive layer is polished by CMP, for example, so that the second layer 10b, the third layer 10c, the first coil 13 and the connecting layers 48 are exposed. The second coil 18 is thereby made up of the portion of the conductive layer remaining in the grooves between the turns of the first coil 13. The above-mentioned polishing is performed such that each of the first coil 13 and the second coil 18 has a thickness of 2.0 to 2.5 µm, for example.

As shown in FIG. 18, a connecting portion 13b to be connected to a connecting layer 35a is provided near the outer end of the first coil 13. The second coil 18 includes connecting portions 18a and 18b to be connected to connecting layers 34a and 33a in the neighborhoods of the inner end and the outer end, respectively.

In the step of forming the first coil 13 or the second coil 18, as shown in FIG. 18, two lead layers 36 and 37 are formed to be disposed outside the first layer 10a of the bottom pole layer 10. The lead layers 36 and 37 include connecting portions 36a and 37a to be connected to the connecting layers 34a and 35a, respectively.

Figures 10A, 10B:
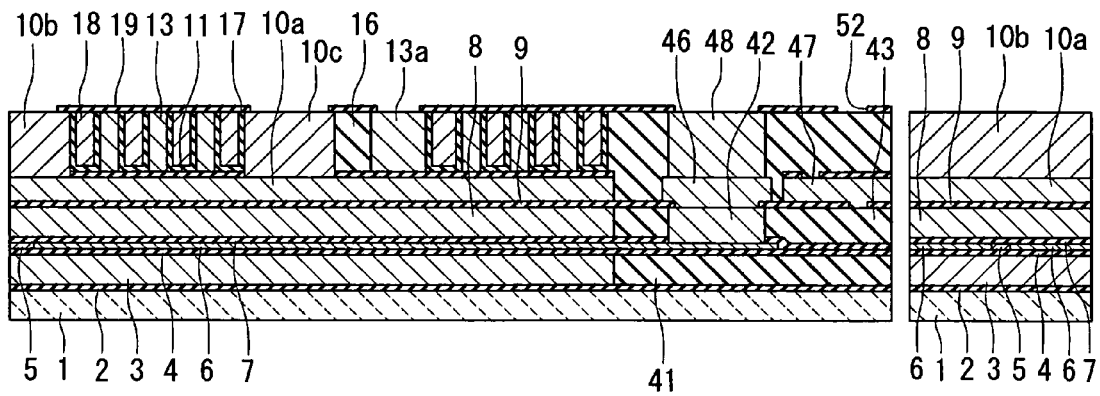
FIG. 10A and FIG. 10B are cross-sectional views for illustrating a step that follows FIG. 9A and FIG. 9B.

FIG. 10A and FIG. 10B illustrate the following step. In the step a coil coating insulating film 19 made of alumina, for example, and having a thickness of 0.1 to 0.3 µm is formed to cover the entire top surface of the layered structure. Next, the following portions of the insulating film 19 are selectively etched: a portion corresponding to the second layer 10b; a portion corresponding to the third layer 10c; portions corresponding to the connecting portions 13a and 13b of the first coil 13; portions corresponding to the connecting portions 18a and 18b of the second coil 18; a portion corresponding to the connecting portion 36a of the lead layer 36; and a portion corresponding to the connecting portion 37a of the lead layer 37. At the same time, portions of the insulating film 19 located farther from the air bearing surface than the connecting layers 48 are selectively etched to form indicators 52 in the insulating film 19. The indicators 52 are used to align a layer that will be formed later. The insulating film 19 thus etched covers the top surfaces of the coils 13 and 18 except the two connecting portions 13a and 13b of the first coil 13 and the two connecting portions 18a and 18b of the second coil 18.

Figures 11A, 11B:
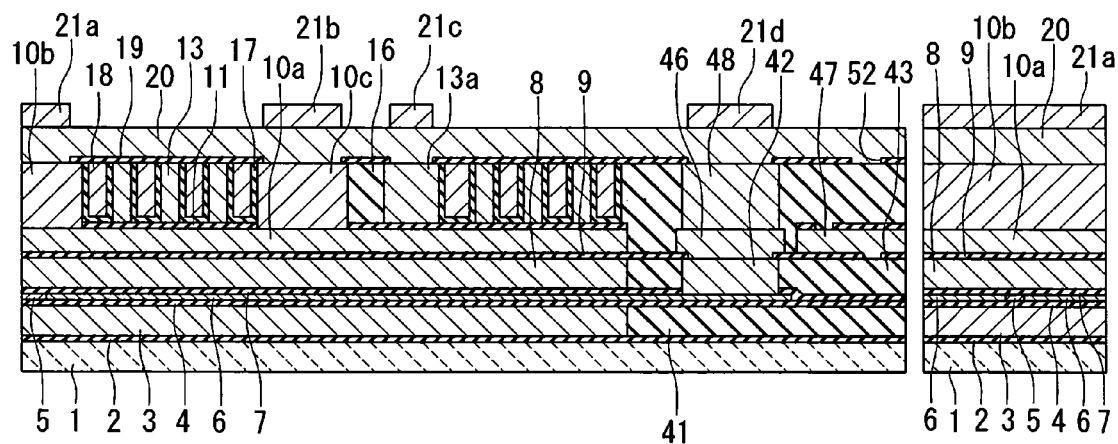
FIG. 11A and FIG. 11B are cross-sectional views for illustrating a step that follows FIG. 10A and FIG. 10B.

FIG. 11A and FIG. 11B illustrate the following step. In the step a magnetic layer 20 made of a magnetic material and having a thickness of 0.8 to 1.2 µm is formed by sputtering to cover the entire top surface of the layered structure. The magnetic layer 20 may be made of a magnetic metal material including at least iron (Fe) among the group consisting of iron, nickel (Ni) and cobalt (Co). Such magnetic materials include NiFe, CoNiFe, FeCo, FeN and CoFeN. In the embodiment it is preferred to use a high saturation flux density material including Co, such as CoNiFe having a saturation flux density of 1.8 to 1.9 T, or FeCo or CoFeN having a saturation flux density of 2.3 to 2.4 T.

Next, etching masks 21a, 21b, 21c and 21d each having a thickness of 1 to 2 µm are formed on the magnetic layer 20 in the portion corresponding to the second layer 10b, the portion corresponding to the third layer 10c, the portion corresponding to the connecting portion 13a of the first coil 13, and the portions corresponding to the connecting layers 48, respectively. At the same time, although not shown, etching masks similar to the etching masks 21a, 21b and 21c are formed on the magnetic layer 20 in the portion corresponding to the connecting portion 13b of the first coil 13, the two portions corresponding to the two connecting portions 18a and 18b of the second coil 18, and the portions corresponding to the connecting portions 36a and 37a of the lead layers 36 and 37.

The above-mentioned etching masks may be made of a metal. In this case, the etching masks may be formed by plating, or frame plating, in particular. The etching masks may be made of a magnetic material different from the material of the magnetic layer 20. This magnetic material may be a material including Ni and Fe, such as NiFe or CoNiFe. The etching masks may be made of a material including Ni, such as Ni, NiCu, NiP or NiB.

The etching masks may be made of an insulating material such as alumina. In this case, the etching masks may be formed by sputtering using a photoresist layer as a mask.

Figures 12A, 12B:
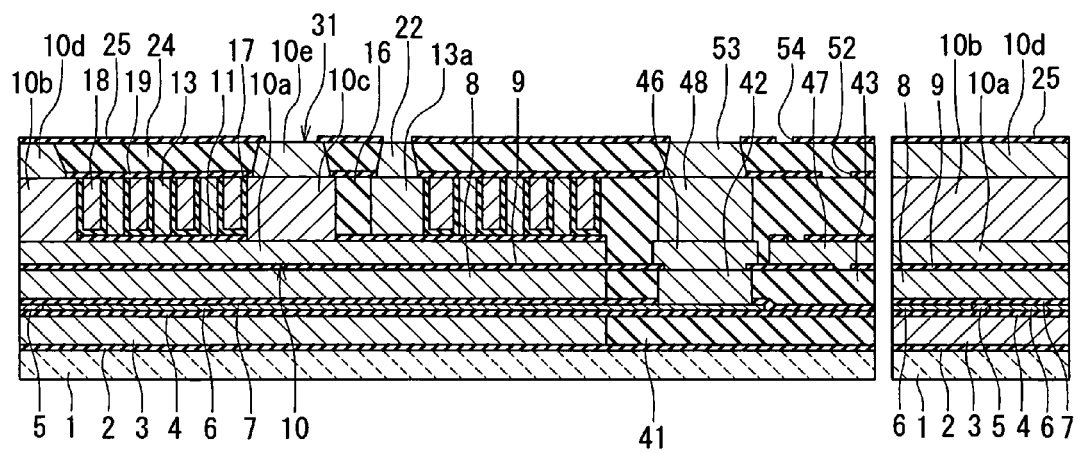
FIG. 12A and FIG. 12B are cross-sectional views for illustrating a step that follows FIG. 11A and FIG. 11B.

FIG. 12A and FIG. 12B illustrate the following step. In the step the magnetic layer 20 is etched by reactive ion etching (hereinafter called RIE), using the above-mentioned etching masks. A fourth layer 10d, a fifth layer 10e, a connecting portion layer 22 and a connecting layer 53 are thereby made up of portions of the magnetic layer 20 remaining below the etching masks 21a to 21d after the etching. Similarly, five connecting portion layers not shown are made up of portions of the magnetic layer 20 remaining below the other five etching masks. The fourth layer 10d is disposed on the second layer 10b. The fifth layer 10e is disposed on the third layer 10c. The connecting portion layer 22 is disposed on the connecting portion 13a. The connecting layer 53 is disposed on the connecting layer 48. The other five connecting portion layers are disposed on the connecting portions 13b, 18a, 18b, 36a and 37a, respectively. Alternatively, the magnetic layer 20 may be etched by ion beam etching in place of RIE.

One of the ends of the fourth layer 10d located farther from the air bearing surface defines the throat height of the write head. The throat height is the length (height) of the pole portions, that is, portions of the two pole layers opposed to each other with the write gap layer in between, the length being taken from the air-bearing-surface-side end to the other end.

The third layer 10c and the fifth layer 10e make up a coupling section 31 for magnetically coupling the bottom pole layer 10 to the top pole layer.

Next, an insulating layer 24 made of alumina, for example, and having a thickness of 1.5 to 2.0 µm is formed to cover the entire top surface of the layered structure. The insulating layer 24 is then polished by CMP, for example. This polishing is performed such that the etching masks are removed, and top surfaces of the fourth layer 10d, the fifth layer 10e, the connecting portion layer 22, the connecting layer 53, the other five connecting portion layers and the insulating layer 24 are flattened.

Next, a write gap layer 25 having a thickness of 0.06 to 0.08 µm is formed to cover the entire top surface of the layered structure. The write gap layer 25 may be made of an insulating material such as alumina or a nonmagnetic metal material such as Ru, NiCu or NiB. Next, a portion of the write gap layer 25 corresponding to the fifth layer 10e, the connecting portion layer 22, the connecting layer 53 and the other five connecting portion layers are selectively etched. At the same time, a portion of the write gap layer 25 located farther from the air bearing surface than the connecting layer 53 is selectively etched to form an indicator 54 in the write gap layer 25. The indicator 54 is used to align a layer that will be formed later.

Figures 13A, 13B:
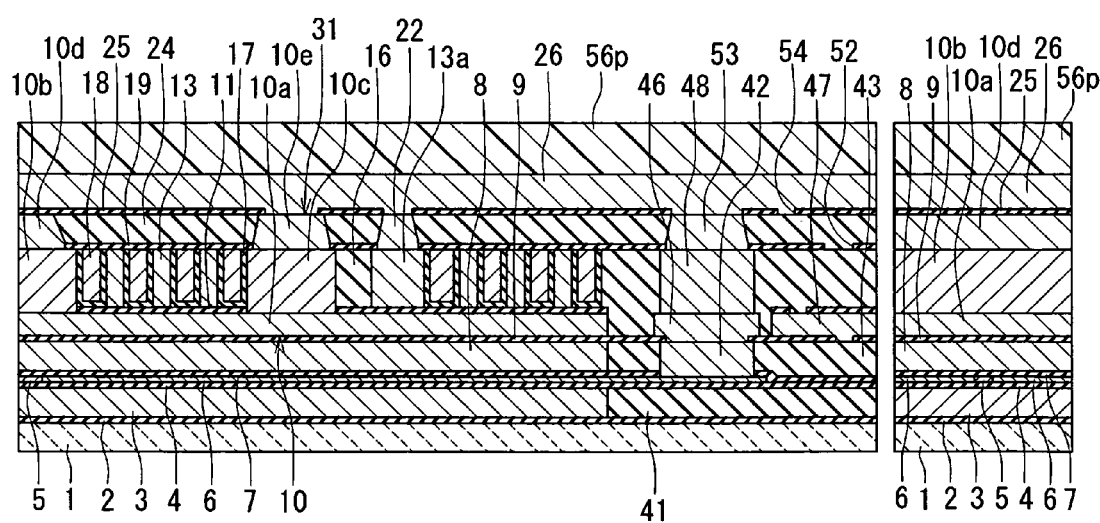
FIG. 13A and FIG. 13B are cross-sectional views for illustrating a step that follows FIG. 12A and FIG. 12B.

FIG. 13A and FIG. 13B illustrate the following step. In the step a magnetic layer 26 made of a magnetic material and having a thickness of 0.5 to 1.2 µm is formed by sputtering, for example, to cover the entire top surface of the layered structure. The magnetic layer 26 may be made of a magnetic metal material including at least iron among the group consisting of iron, nickel and cobalt. Such magnetic materials include NiFe, CoNiFe, FeCo, FeN and CoFeN. In the embodiment, among these materials, it is preferred to use a high saturation flux density material including Co, such as CoNiFe having a saturation flux density of 1.8 to 1.9 T, or FeCo or CoFeN having a saturation flux density of 2.3 to 2.4 T.

Next, a photoresist layer 56p is formed to cover the entire top surface of the layered structure. In the embodiment the photoresist layer 56p is made of a positive resist.

Figures 14A, 14B:
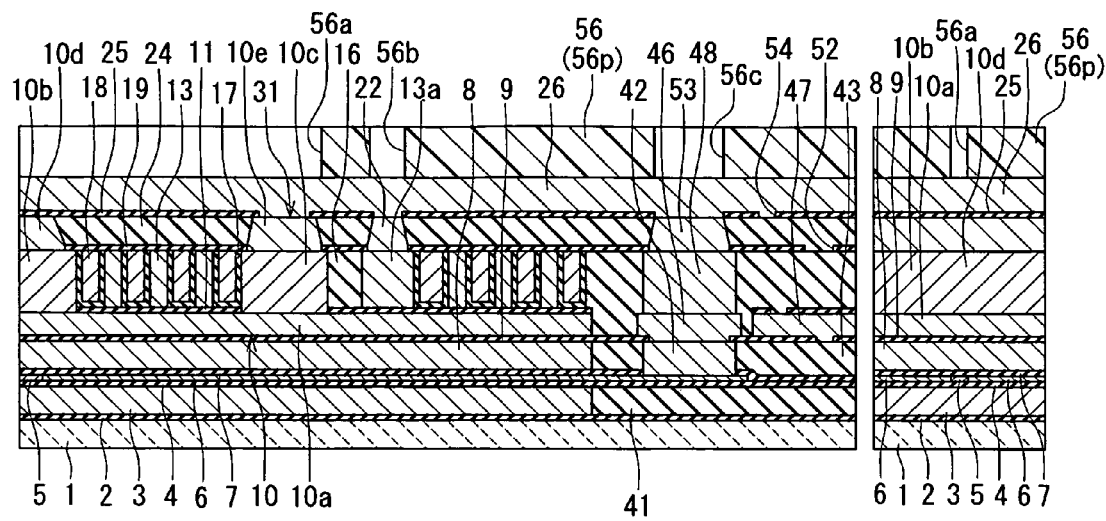
FIG. 14A and FIG. 14B are cross-sectional views for illustrating a step that follows FIG. 13A and FIG. 13B.

FIG. 14A and FIG. 14B illustrate the following step. In the step the photoresist layer 56p is patterned by photolithography to form a frame 56 that is used to form the top pole layer and a plurality of connecting layers by frame plating. That is, in this step, the photoresist layer 56p is exposed to light having a pattern corresponding to the shapes of the top pole layer and the connecting layers. Next, the photoresist layer 56p is developed. A plurality of grooves corresponding to the top pole layer and the connecting layers are thereby formed in the photoresist layer 56p, and the photoresist layer 56p is made into the frame 56. Among the grooves of the photoresist layer 56p, FIG. 14A shows the groove 56a corresponding to the top pole layer, the groove 56b corresponding to the connecting layer connected to the connecting portion layer 22, and the groove 56c corresponding to the connecting layer connected to the connecting layer 53. Although not shown, grooves corresponding to the other two connecting layers are formed in the photoresist layer 56p, too. The method of exposing the photoresist layer 56p of the embodiment will be described in detail later.

Figures 15A, 15B:
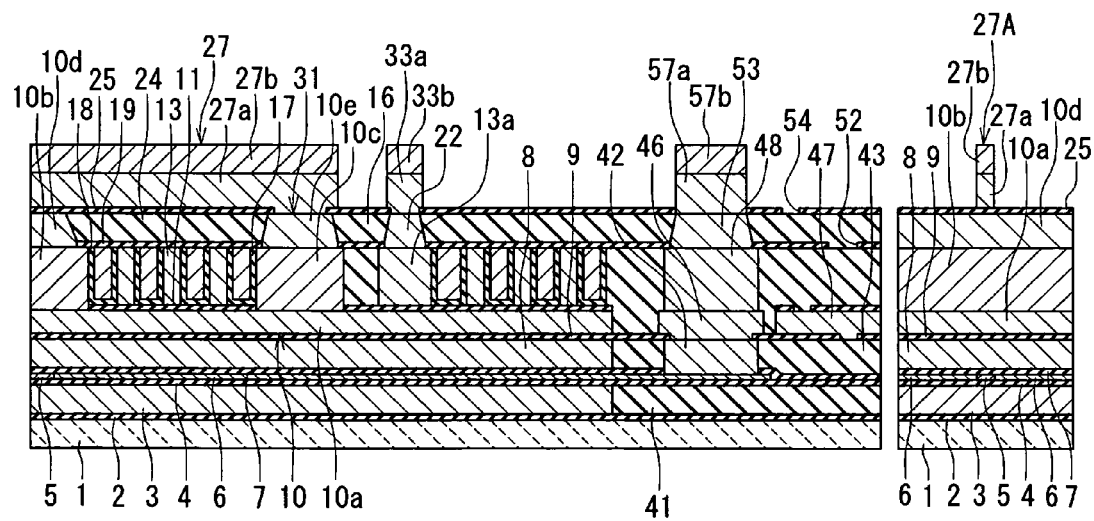
FIG. 15A and FIG. 15B are cross-sectional views for illustrating a step that follows FIG. 14A and FIG. 14B.

FIG. 15A and FIG. 15B illustrate the following step. In the step a second layer 27b of the top pole layer 27, a connecting layer 33b, a connecting layer 57b, and connecting layers 34b and 35b shown in FIG. 18, each of which has a thickness of 1 to 2 µm, for example, are formed by frame plating, using the above-mentioned frame 56, on the magnetic layer 26. The second layer 27b and the connecting layers 33b, 57b, 34b and 35b are made of a magnetic metal material, such as NiFe or CoNiFe, that is different from the material of the magnetic layer 26. The second layer 27b extends from the region corresponding to the fourth layer 10d to the region corresponding to the fifth layer 10e of the bottom pole layer 10. The connecting layer 33b extends from the region corresponding to the connecting portion 13a to the region corresponding to the connecting portion 18b. The connecting layer 57b is formed in the region corresponding to the connecting layer 53. The connecting layer 34b extends from the region corresponding to the connecting portion 18a to the region corresponding to the connecting portion 36a. The connecting layer 35b extends from the region corresponding to the connecting portion 13b to the region corresponding to the connecting portion 37a.

Next, the magnetic layer 26 is selectively etched by RIE, using the second layer 27b, the connecting layers 33b, 57b, 34b and 35b as etching masks. A first layer 27a of the top pole layer 27 and connecting layers 33a, 57a, 34a and 35a are thereby made up of portions of the magnetic layer 26 remaining after the etching. The first layer 27a is disposed below the second layer 27b. The connecting layers 33a, 57a, 34a and 35a are disposed below the connecting layers 33b, 57b, 34b and 35b, respectively.

The top pole layer 27 has the first layer 27a that is in contact with the write gap layer 25, and the second layer 27b disposed on the first layer 27a. As shown in FIG. 19, the top pole layer 27 includes a track width defining portion 27A and a wide portion 27B. The track width defining portion 27A has an end located in the air bearing surface and the other end located away from the air bearing surface. The wide portion 27B is coupled to the other end of the track width defining portion 27A. The track width defining portion 27A has a width equal to the write track width. The track width defining portion 27A makes up the pole portion of the top pole layer 27. The wide portion 27B has a width greater than the write track width. To be specific, the wide portion 27B is equal in width to the track width defining portion 27A at the interface with the track width defining portion 27A. The wide portion 27B gradually increases in width as the distance from the track width defining portion 27A increases, and then maintains a specific width to the end.

The first layer 27a and the second layer 27b include track width defining portions 27Aa and 27Ab and wide portions 27Ba and 27Bb, respectively. The track width defining portions 27Aa and 27Ab correspond to the track width defining portion 27A and have a width equal to the write track width. The wide portions 27Ba and 27Bb correspond to the wide portion 27B and have a width greater than the write track width.

Alternatively, the sidewalls of the track width defining portion 27A may be etched by ion beam etching, for example, after the top pole layer 27 is formed, so as to reduce the width of the track width defining portion 27A.

Figures 16A, 16B:
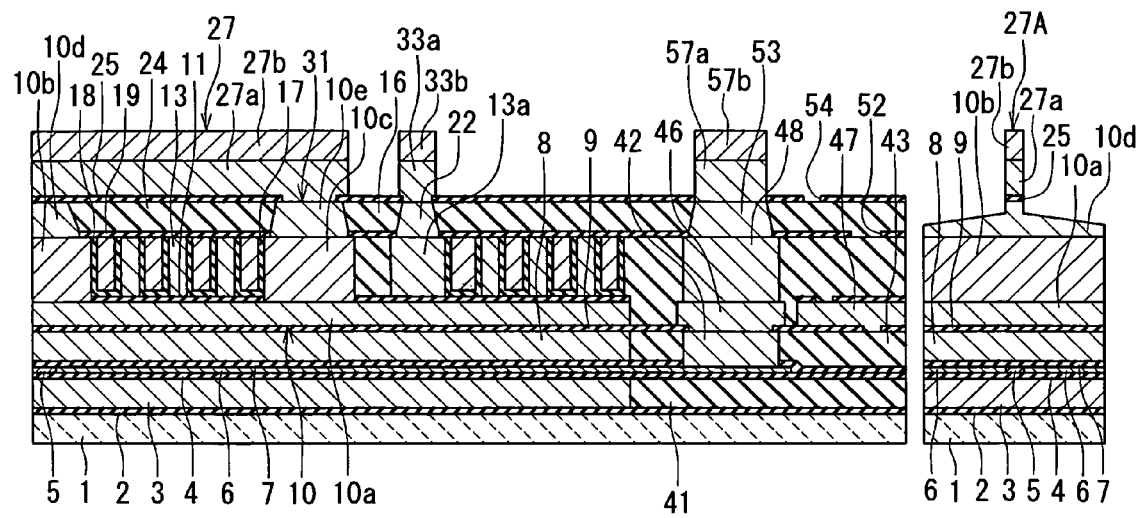
FIG. 16A and FIG. 16B are cross-sectional views for illustrating a step that follows FIG. 15A and FIG. 15B.

FIG. 16A and FIG. 16B illustrate the following step. In the step, although not shown, a photoresist mask having an opening around the track width defining portion 27A is formed. Using the photoresist mask and the top pole layer 27 as masks, a portion of the write gap layer 25 around the track width defining portion 27A is etched by ion beam etching or RIE using a mixture of $Cl_2$ and $BCl_3$ as an etching gas, for example.

Next, a portion of the fourth layer 10d of the bottom pole layer 10 around the track width defining portion 27A is etched by ion beam etching, for example, using the top pole layer 27, the write gap layer 25 below the top pole layer 27, and the above-mentioned photoresist mask as masks. In place of ion beam etching, the fourth layer 10d may be etched by RIE under the condition the same as the condition under which the magnetic layer 26 is etched.

In such a manner, the trim structure as shown in FIG. 16B is formed. The trim structure is capable of suppressing an increase in the effective write track width due to expansion of a magnetic flux generated during writing on a narrow track. The fourth layer 10d has a portion opposed to the track width defining portion 27A of the top pole layer 27 with the write gap layer 25 disposed in between. This portion is the pole portion of the bottom pole layer 10.

Figures 17A, 17B:
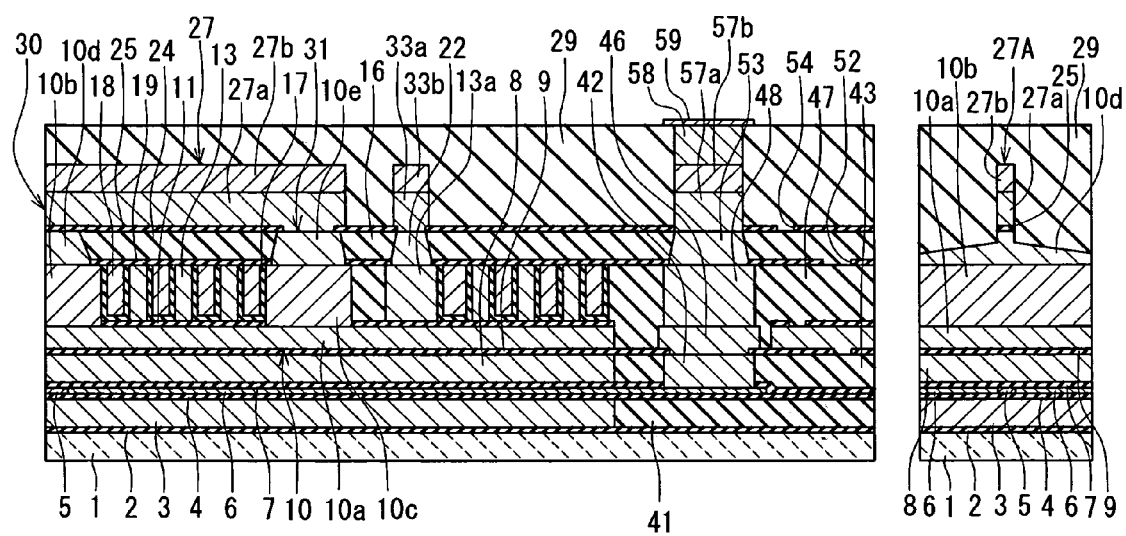
FIG. 17A and FIG. 17B are cross-sectional views for illustrating a step that follows FIG. 16A and FIG. 16B.

FIG. 17A and FIG. 17B illustrate the following step. In the step a pair of connecting layers 58 made of Cu, for example, are formed by frame plating, for example, on the pair of connecting layers 57b. At the same time, although not shown, connecting layers made of Cu, for example, are formed on portions near ends of the lead layers 36 and 37 opposite to the connecting portions 36a and 37a, too. Next, the overcoat layer 29 made of alumina, for example, and having a thickness of 20 to 30 µm is formed so as to cover the entire top surface of the layered structure, and the surface of the overcoat layer 29 is flattened. The top surfaces of the pair of connecting layers 58 and the pair of connecting layers formed on the lead layers 36 and 37 are thereby exposed. Next, pads for electrodes made of Au, for example, are formed on the connecting layers exposed. In FIG. 17A the pad 59 formed on the connecting layers 58 is only shown. Finally, the slider including the foregoing layers is lapped to form the air bearing surface 30. The thin-film magnetic head including the read and write heads is thus completed.

The thin-film magnetic head according to the present embodiment comprises the air bearing surface 30 serving as a medium facing surface that faces toward a recording medium. The magnetic head further comprises the read head and the write head (the induction-type electromagnetic transducer).

The read head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. The portions of the bottom shield layer 3 and the top shield layer 8 located on a side of the air bearing surface 30 are opposed to each other with the MR element 5 disposed in between.

The write head comprises the bottom pole layer 10 and the top pole layer 27 that are magnetically coupled to each other and include the pole portions opposed to each other and located in the regions of the pole layers on the side of the air bearing surface 30. The write head further comprises: the write gap layer 25 disposed between the pole portion of the bottom pole layer 10 and the pole portion of the top pole layer 27; and the coils 13 and 18 provided such that at least part of each of the coils is disposed between the bottom pole layer 10 and the top pole layer 27 and insulated from the bottom pole layer 10 and the top pole layer 27. The bottom pole layer 10 and the top pole layer 27 of the present embodiment correspond to the first pole layer and the second pole layer of the invention, respectively.

The bottom pole layer 10 includes the first layer 10a, the second layer 10b, the fourth layer 10d, the third layer 10c, and the fifth layer 10e. The first layer 10a is disposed to be opposed to the coils 13 and 18. The second layer 10b is disposed closer to the air bearing surface 30 than the coils 13 and 18 and connected to one of the surfaces of the first layer 10a closer to the write gap layer 25. The fourth layer 10d has a surface connected to one of the surfaces of the second layer 10b closer to the write gap layer 25 and has the other surface located adjacent to the write gap layer 25. The third layer 10c is disposed on a region of the first layer 10a located at a distance from the air bearing surface 30. The fifth layer 10e is disposed on the third layer 10c. The third layer 10c and the fifth layer 10e make up the coupling section 31 for magnetically coupling the bottom pole layer 10 to the top pole layer 27 (See FIG. 18).

The top pole layer 27 is formed on the flat write gap layer 25 and flat throughout. The top pole layer 27 has the first layer 27a and the second layer 27b that are both flat. The top pole layer 27 includes the track width defining portion 27A and the wide portion 27B. The track width defining portion 27A has an end located in the air bearing surface 30 and the other end opposite to the air bearing surface 30, and has a width equal to the write track width. The wide portion 27B is coupled to the other end of the track width defining portion 27A and has a width greater than the write track width. Similarly, the first layer 27a and the second layer 27b include the track width defining portions 27Aa and 27Ab and the wide portions 27Ba and 27Bb, respectively. The track width defining portions 27Aa and 27Ab each have an end located in the air bearing surface 30 and the other end opposite to the air bearing surface 30, and have a width equal to the write track width. The wide portions 27Ba and 27Bb are coupled to the other ends of the track width defining portions 27Aa and 27Ab, respectively, and each have a width greater than the write track width. The second layer 27b corresponds to the track width defining layer of the invention.

The write track width is not limited to a specific value but preferably falls within a range of 0.05 to 0.15 μm inclusive to improve the recording density. The length of each of the track width defining portions 27A, 27Aa and 27Ab taken along the direction orthogonal to the air bearing surface 30 is not limited to a specific value but preferably falls within a range of 0.05 to 0.5 μm inclusive to improve the overwrite property, and more preferably falls within a range of 0.05 to 0.3 μm inclusive.

As shown in FIG. 18, the thin-film coil of the embodiment includes the first coil 13 and the second coil 18. The first coil 13 has turns part of which is disposed between the second layer 10b and the third layer 10c of the bottom pole layer 10.

The second coil 18 has turns at least part of which is disposed between the turns of the first coil 13. Part of the turns of the second coil 18 is disposed between the second layer 10b and the third layer 10c, too. The coils 13 and 18 are both flat-whorl-shaped and disposed around the coupling section 31.

The connecting portion 13b of the first coil 13 is connected to the lead layer 37 through the connecting layers 35a and 35b. The connecting portion 13a of the first coil 13 is connected to the connecting portion 18b of the second coil 18 through the connecting layers 33a and 33b. The connecting portion 18a of the second coil 18 is connected to the lead layer 36 through the connecting layers 34a and 34b. In such a manner continuous turns are made up of the coils 13 and 18.

The step of forming the second layer 27b of the top pole layer 27 of the embodiment will now be described in detail. The step of forming the second layer 27b includes the steps of: forming the photoresist layer 56p as the resist layer of the invention; and exposing the photoresist layer 56p to radiant energy such as light so as to form a latent image corresponding to the second layer 27b as the track width defining layer in the photoresist layer 56p. The step of forming the second layer 27b further includes the steps of: forming the frame 56 having the groove corresponding to the second layer 27b by developing the photoresist layer 56p exposed; and forming the second layer 27b by frame plating using the frame 56.

The step of exposing the photoresist layer 56p includes: a first exposure step of exposing the photoresist layer 56p to radiant energy such as light so as to form a first latent image in the photoresist layer 56p; and a second exposure step of exposing the photoresist layer 56p to radiant energy such as light so as to form a second latent image in the photoresist layer 56p, the second exposure step being performed before or after the first exposure step.

Figure 20:
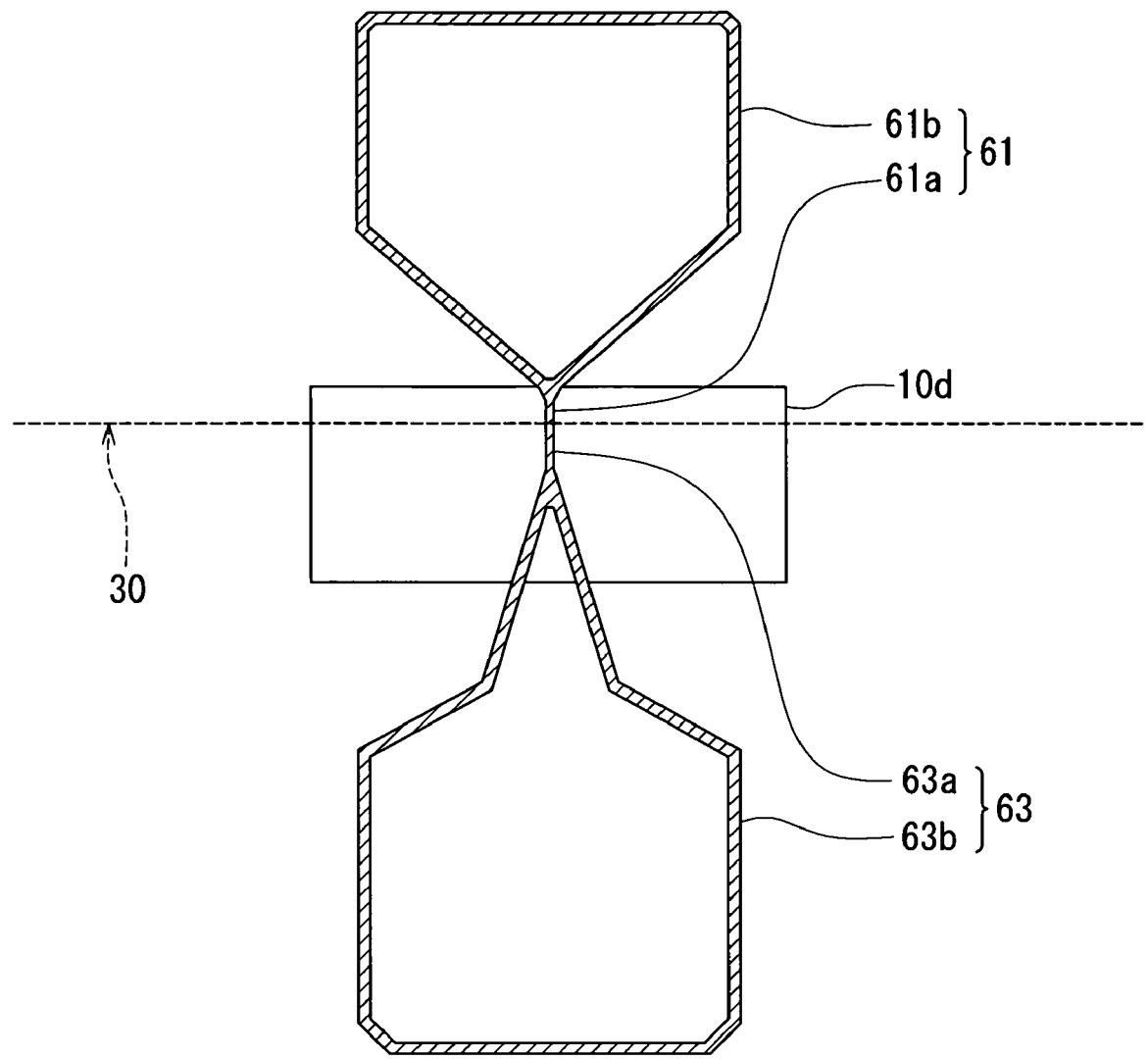
FIG. 20 illustrates a region in which radiant energy is applied to the photoresist layer in a first exposure step of the first embodiment.
Figure 21:
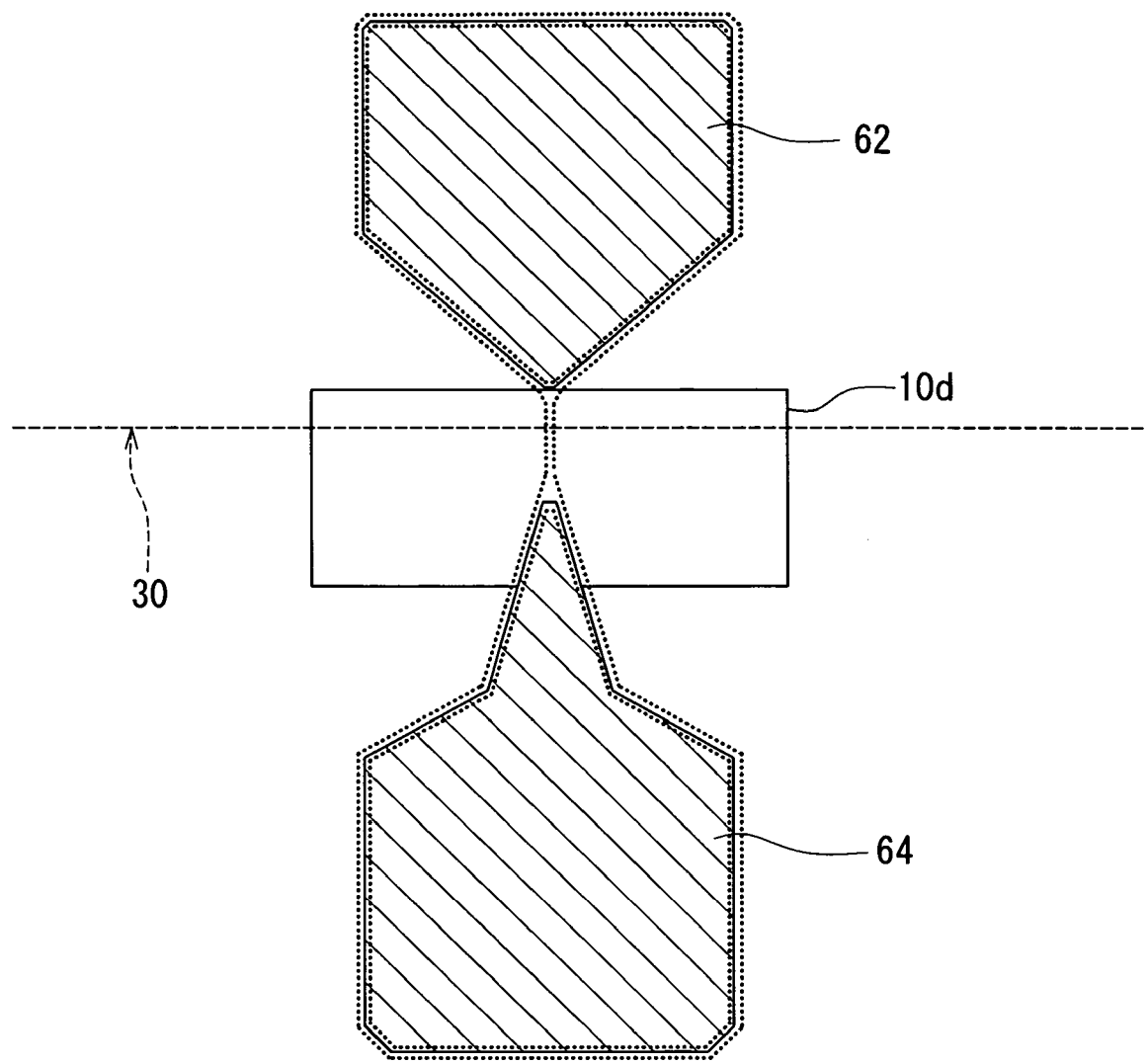
FIG. 21 illustrates a region in which radiant energy is applied to the photoresist layer in a second exposure step of the first embodiment.

FIG. 20 illustrates a region with hatching in which radiant energy is applied to the photoresist layer 56p in the first exposure step. FIG. 21 illustrates a region with hatching in which radiant energy is applied to the photoresist layer 56p in the second exposure step.

In FIG. 20 and FIG. 21 the portion above the broken line indicating the air bearing surface 30 is the portion to be the thin-film magnetic head. The portion below the broken line indicating the air bearing surface 30 is the portion to be removed before the air bearing surface 30 is formed in the course of manufacturing the thin-film magnetic head. In this portion to be removed a terminal section (not shown) is formed, which is used for an inspection performed to determine whether a short of the thin-film coil exists and used for preventing static damage to the MR element 5 in the course of manufacturing the thin-film magnetic head. This terminal section is formed at the same time as the second layer 27b and coupled to the second layer 27b. The terminal section includes: a narrow portion that adjoins the track width defining portion 27Ab of the second layer 27b and extends; and a wide portion coupled to the narrow portion.

As shown in FIG. 20, in the first exposure step, radiant energy is applied to the region with hatching so that a first latent image 61 and a third latent image 63 are formed in the photoresist layer 56p. The first latent image 61 is made up of: a first portion 61a corresponding to the track width defining portion 27Ab of the second layer 27b; and a second portion 61b that adjoins the first portion 61a and extends along the contour of the wide portion 27Bb of the second layer 27b. The third latent image 63 is made up of: a portion 63a corresponding to the narrow portion of the terminal section; and a portion 63b that adjoins the portion 63a and extends along the contour of the wide portion of the terminal section.

Each of the first portion 61a of the first latent image 61 and the portion 63a of the third latent image 63 may have a width equal to the write track width that falls within a range of 0.05 to 0.15 µm inclusive, for example, or may be slightly greater than the write track width. If each of the portions 61a and 63a has a width greater than the write track width, the width of the track width defining portion 27Ab of the second layer 27b immediately after the track width defining portion 27Ab is formed by frame plating, and the width of the track width defining portion 27A that is equal to the width of the track width defining portion 27Ab are greater than the write track width. Therefore, in this case, the sidewalls of the track width defining portion 27A are etched by ion beam etching, for example, to make the width of the track width defining portion 27A equal to a desired write track width.

Each of the second portion 61b of the first latent image 61 and the portion 63b of the third latent image 63 may have a width equal to or slightly greater than the width of each of the first portion 61a of the first latent image 61 and the portion 63a of the third latent image 63. For example, each of the portions 61b and 63b may have a width that falls within a range of 0.15 to 0.3 µm inclusive.

As shown in FIG. 21, in the second exposure step, radiant energy is applied to the region with hatching so that a second latent image 62 and a fourth latent image 64 are formed in the photoresist layer 56p. In FIG. 21 the first latent image 61 and the third latent image 63 formed in the first exposure step are shown by dotted lines.

The second latent image 62 is intended for use in combination with the first latent image 61 so as to form the latent image corresponding to the second layer 27b, and does not include a portion corresponding to the track width defining portion 27Ab of the second layer 27b. In the example shown in FIG. 21 the second latent image 62 has a geometry corresponding to the wide portion 27Bb of the second layer 27b except a portion near the contour of the wide portion 27Bb. A portion of one of the first and second latent images 61 and 62 is overlaid on a portion of the other.

The fourth latent image 64 is intended for use in combination with the third latent image 63 so as to form a latent image corresponding to the terminal section, and does not include a portion corresponding to the narrow portion of the terminal section. In the example shown in FIG. 21 the fourth latent image 64 has a geometry corresponding to the wide portion of the terminal section except a portion near the contour of the wide portion. A portion of one of the third and fourth latent images 63 and 64 is overlaid on a portion of the other.

In the embodiment the amount of radiant energy per unit area applied to the photoresist layer 56p in the first exposure step is greater than the amount of radiant energy per unit area applied to the photoresist layer 56p in the second exposure step. The amount of radiant energy per unit area may be controlled by adjusting the exposure period.

Typically, for the positive resist, the greater the amount of radiant energy per unit area applied thereto, the thinner are the trace widths of a latent image. Therefore, when a latent image is formed in a photoresist layer made of a positive resist, there is a difference between an amount of radiant energy per unit area suitable for making a latent image of smaller width and an amount of radiant energy per unit area suitable for making a latent image of greater width. That is, it is required to increase the amount of radiant energy per unit area for making a latent image of smaller width while it is not necessary to increase the amount of radiant energy per unit area for making a latent image of greater width as such.

To make a comparison with the embodiment of the invention, a case will now be considered wherein a latent image corresponding to the second layer 27b is formed in the photoresist layer 56p by a single exposure. In this case, the latent image corresponding to the second layer 27b includes a portion of smaller width corresponding to the track width defining portion 27Ab and a portion of greater width corresponding to the wide portion 27Bb. To form this latent image by a single exposure, it is required to increase the amount of radiant energy per unit area for making the portion of smaller width. However, this results in an increase in the amount of radiant energy reflected off the portion of the electrode film below the photoresist layer 56p, the portion corresponding to the wide portion 27Bb. As a result, there arises a problem that disturbance to the shape occurs around a portion of the frame 56 corresponding to the interface between the track width defining portion 27Ab and the wide portion 27Bb of the second layer 27b. On the other hand, when the latent image corresponding to the second layer 27b is formed, if the amount of radiant energy per unit area is adjusted to the amount suitable for making the portion of greater width corresponding to the wide portion 27Bb, it is impossible to form the portion of smaller width corresponding to the track width defining portion 27Ab.

According to the embodiment, in contrast, the latent image corresponding to the second layer 27b is formed in the photoeresist layer 56p by the two exposure steps, that is, the first and second exposure steps as described above. In the first exposure step, the first latent image 61 and the third latent image 63 including the portions of smaller width are formed, so that it is required to increase the amount of radiant energy per unit area applied to the photoresist layer 56p. However, a major part of the portion corresponding to the wide portion 27Bb is not exposed in the first exposure step. Consequently, in the first exposure step, the amount of radiant energy reflected off the portion of the electrode film corresponding to the wide portion 27Bb is small. The shape of the frame 56 is thereby prevented from being disturbed.

In the second exposure step, the second latent image 62 and the fourth latent image 64 that do not include any portion of smaller width are formed, so that the amount of radiant energy per unit area applied to the photoresist layer 56p may be smaller, compared to the first exposure step. Therefore, in the second exposure step, the amount of radiant energy reflected off the portion of the electrode film corresponding to the wide portion 27Bb is smaller, compared to the case in which the latent image corresponding to the second layer 27b is formed by a single exposure. The shape of the frame 56 is thereby prevented from being disturbed in the second exposure step, too.

According to the embodiment as thus described, each of the first and second exposure steps is performed under an appropriate condition, and the second layer 27b that defines the track width is thereby formed with accuracy. According to the embodiment, each of the flat first layer 27a and the flat second layer 27b is formed on the flat surface. These features of the embodiment allow the track width defining portion 27A to have reduced dimensions and to be formed with accuracy. As a result, it is possible to reduce the track width and to improve the recording density.

[Second Embodiment]

Figure 22:
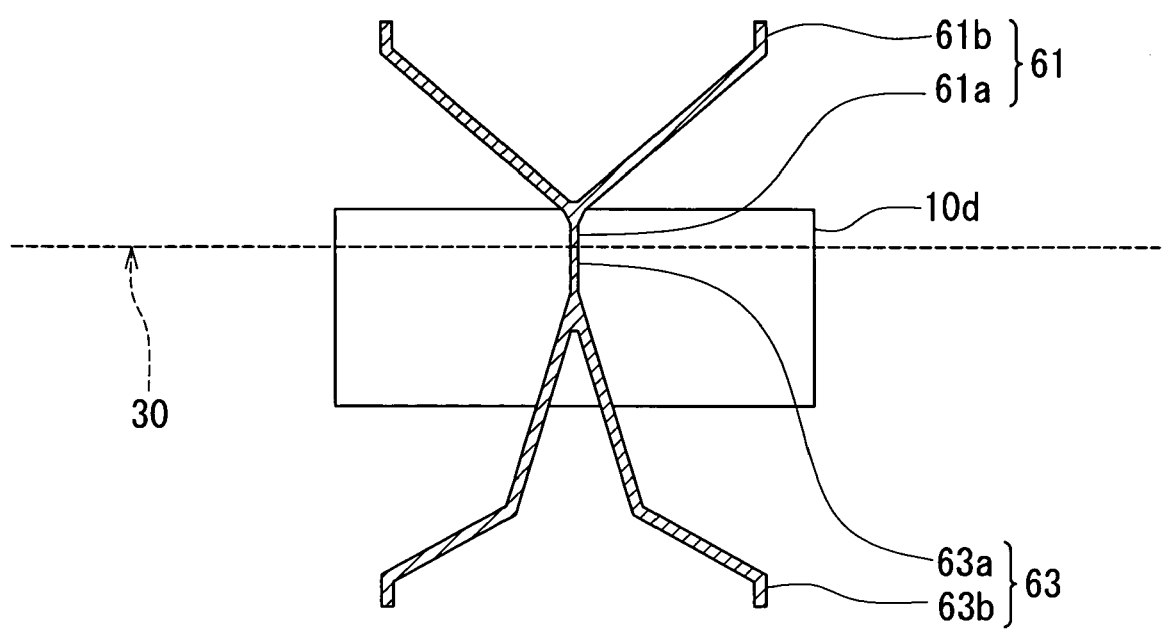
FIG. 22 illustrates a region in which radiant energy is applied to the photoresist layer in a first exposure step of a second embodiment of the invention.
Figure 23:
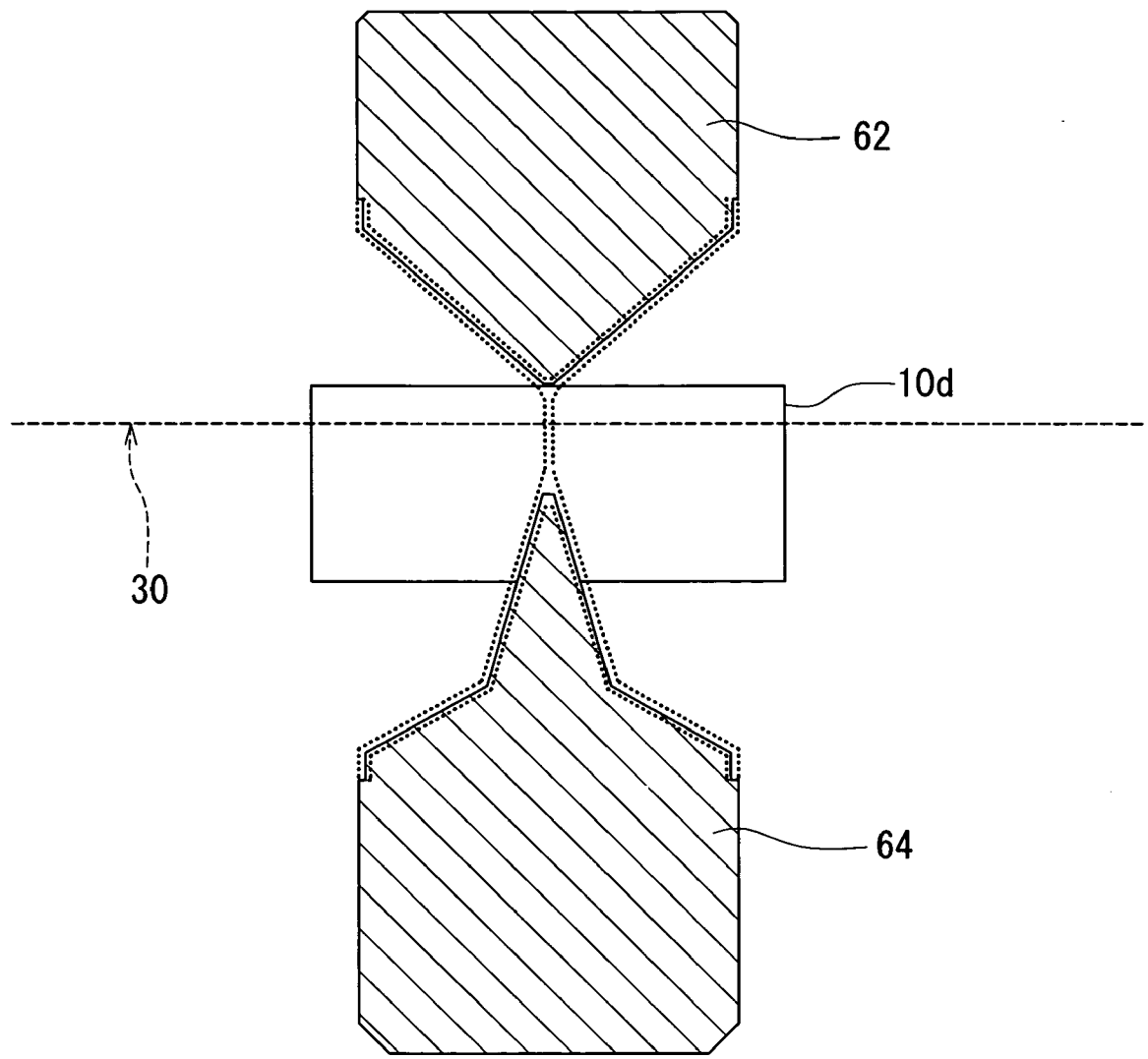
FIG. 23 illustrates a region in which radiant energy is applied to the photoresist layer in a second exposure step of the second embodiment.

Reference is now made to FIG. 22 and FIG. 23 to describe a second embodiment of the invention. FIG. 22 illustrates a region with hatching in which radiant energy is applied to the photoresist layer 56p in the first exposure step of the second embodiment. FIG. 23 illustrates a region with hatching in which radiant energy is applied to the photoresist layer 56p in the second exposure step of the second embodiment.

As shown in FIG. 22, in the first exposure step, radiant energy is applied to the region with hatching so that the first latent image 61 and the third latent image 63 are formed in the photoresist layer 56p. The first latent image 61 is made up of: the first portion 61a corresponding to the track width defining portion 27Ab of the second layer 27b; and the second portion 61b that adjoins the first portion 61a and extends along part of the contour of the wide portion 27Bb of the second layer 27b. The third latent image 63 is made up of: the portion 63a corresponding to the narrow portion of the terminal section; and the portion 63b that adjoins the portion 63a and extends along part of the contour of the wide portion of the terminal section.

As shown in FIG. 23, in the second exposure step, radiant energy is applied to the region with hatching so that the second latent image 62 and the fourth latent image 64 are formed in the photoresist layer 56p. In FIG. 23 the first latent image 61 and the third latent image 63 formed in the first exposure step are shown by dotted lines.

The second latent image 62 is intended for use in combination with the first latent image 61 so as to form a latent image corresponding to the second layer 27b, and does not include a portion corresponding to the track width defining portion 27Ab of the second layer 27b. In the example shown in FIG. 23 the second latent image 62 has a geometry corresponding to the wide portion 27Bb of the second layer 27b except a portion near the contour of the wide portion 27Bb. A portion of one of the first and second latent images 61 and 62 is overlaid on a portion of the other.

The fourth latent image 64 is intended for use in combination with the third latent image 63 so as to form a latent image corresponding to the terminal section, and does not include a portion corresponding to the narrow portion of the terminal section. In the example shown in FIG. 23 the fourth latent image 64 has a geometry corresponding to the wide portion of the terminal section except a portion near the contour of the wide portion. A portion of one of the third and fourth latent images 63 and 64 is overlaid on a portion of the other.

As in the second embodiment, it is possible that the second portion 61b of the first latent image 61 formed in the first exposure step does not extend along the entire contour of the wide portion 27Bb but extends along part of the contour of the wide portion 27Bb. The remainder of configuration, function and effects of the second embodiment are similar to those of the first embodiment.

[Third Embodiment]

A third embodiment of the invention will now be described. Reference is now made to FIG. 24A and FIG. 24B to describe the outline of a method of manufacturing a thin-film magnetic head of the third embodiment. FIG. 24A and FIG. 24B are cross sections of the thin-film magnetic head of the embodiment. FIG. 24A is a cross section orthogonal to the air bearing surface and the top surface of a substrate. FIG. 24B is a cross section of pole portions parallel to the air bearing surface.

In the method of manufacturing the thin-film magnetic head of the embodiment, the insulating layer 2 made of alumina ($Al_2O_3$), for example, is deposited on the substrate 1 made of aluminum oxide and titanium carbide ($Al_2O_3$—TiC), for example. Next, the bottom shield layer 3 made of a magnetic material is formed on the insulating layer 2. Next, the bottom shield gap film 4 serving as an insulating film is formed on the bottom shield layer 3. On the bottom shield gap film 4, the MR element 5 is formed. Next, a pair of electrode layers 6 to be electrically connected to the MR element 5 are formed on the bottom shield gap film 4. The top shield gap film 7 serving as an insulating film is formed on the bottom shield gap film 4 and the MR element 5. The MR element 5 is embedded in the shield gap films 4 and 7. Next, the top shield layer 8 made of a magnetic material is formed on the top shield gap film 7. Next, the insulating layer 9 made of alumina, for example, is formed over the entire top surface of the layered structure obtained through the foregoing steps. The steps described so far are the same as those of the first embodiment.

In the following step of the third embodiment, a bottom pole layer 70 is formed on the insulating layer 9. The bottom pole layer 70 includes first to third layers 70a, 70b and 70c each of which is made of a magnetic material. In the step of forming the bottom pole layer 70, the first layer 70a is first formed on the insulating layer 9. Next, a magnetic layer is formed on the first layer 70a. This magnetic layer is selectively etched to form the second layer 70b and the third layer 70c. The second layer 70b is disposed near the air bearing surface 90. The third layer 70c is a portion for connecting the first layer 70a to a top pole layer described later and is disposed near the center of a thin-film coil described later. Next, an insulating layer 71 made of alumina, for example, and having a thickness equal to or greater than the thickness of each of the second layer 70b and the third layer 70c is formed on the entire surface, and polished so that the second layer 70b and the third layer 70c are exposed, and the surface is flattened. One of the ends of the second layer 70b farther from the air bearing surface 90 defines the throat height of the write head.

Next, a write gap layer 75 made of an insulating material or a nonmagnetic metal material is formed to cover the entire top surface of the layered structure. The write gap layer 75 is then selectively etched to form an opening in the region corresponding to the third layer 70c.

Next, the top pole layer 77 and the thin-film coil are formed. The top pole layer 77 includes first to seventh layers 77a, 77b, 77c, 77d, 77e, 77f and 77g each of which is made of a magnetic material. The thin-film coil includes a first coil 81 and a second coil 85 each of which is made of Cu, for example.

In the step of forming the top pole layer 77 and the thin-film coil, the first layer 77a is formed on the write gap layer 75, and the second layer 77b is formed on the third layer 70c exposed from the opening of the write gap layer 75. The first layer 77a is disposed near the air bearing surface 90. The first layer 77a includes a track width defining portion which will be described in detail later.

Next, a photoresist mask having an opening around the track width defining portion of the first layer 77a is formed. Using this photoresist mask and the first layer 77a as masks, a portion of the write gap layer 75 around the track width defining portion is etched by RIE or ion beam etching, for example. Next, using the first layer 77a, the write gap layer 75 below the first layer 77a, and the above-mentioned photoresist mask as masks, a portion of the second layer 70b and a portion of the first layer 70a each of the bottom pole layer 70 around the track width defining portion are etched by RIE or ion beam etching, for example. The trim structure as shown in FIG. 24B is thereby formed.

Next, an insulating layer 78 made of alumina, for example, and having a thickness equal to or greater than the thickness of each of the first layer 77a and the second layer 77b is formed on the entire surface, and polished by CMP, for example, so that the first layer 77a and the second layer 77b are exposed, and the surface is flattened.

Next, the first coil 81 is formed on the insulating layer 78. The first coil 81 is wound around the second layer 77b. Next, the third layer 77c is formed on the first layer 77a, and the fourth layer 77d is formed on the second layer 77b. One of the ends of the third layer 77c closer to the air bearing surface 90 is located at a distance from the air bearing surface 90. Next, an insulating layer 82 of photoresist, for example, is formed to cover the first coil 81. An insulating layer 83 made of alumina, for example, and having a thickness equal to or greater than the thickness of each of the third layer 77c and the fourth layer 77d is formed on the entire surface, and polished by CMP, for example, so that the third layer 77c and the fourth layer 77d are exposed, and the surface is flattened. The top surface of the first coil 81 may be either exposed or unexposed by this polishing.

Next, an insulating layer 84 of alumina, for example, is formed to cover the top surface of the first coil 81. The second coil 85 is then formed on the insulating layer 84. The second coil 85 is wound around the fourth layer 77d. Next, the fifth layer 77e is formed on the third layer 77c, and the sixth layer 77f is formed on the fourth layer 77d. One of the ends of the fifth layer 77e closer to the air bearing surface 90 is located at a distance from the air bearing surface 90. Next, an insulating layer 86 of photoresist, for example, is formed to cover the second coil 85. An insulating layer 87 made of alumina, for example, and having a thickness equal to or greater than the thickness of each of the fifth layer 77e and the sixth layer 77f is formed on the entire surface, and polished by CMP, for example, so that the fifth layer 77e and the sixth layer 77f are exposed, and the surface is flattened. The top surface of the second coil 85 may be either exposed or unexposed by this polishing.

The first coil 81 and the second coil 85 are both flat-whorl-shaped. However, the direction of winding that starts from the outer end of the turns of the second coil 85 to the inner end thereof is the opposite to the direction of winding that starts from the outer end of the turns of the first coil 81 to the inner end thereof. The inner end of the first coil 81 is connected to the inner end of the second coil 85, and the adjoined turns are thereby formed.

Next, the seventh layer 77g is formed to couple the fifth layer 77e to the sixth layer 77f. One of the ends of the seventh layer 77g closer to the air bearing surface 90 is located at a distance from the air bearing surface 90. Next, an overcoat layer 89 made of alumina, for example, is formed so as to cover the entire top surface of the layered structure, and the surface of the overcoat layer 89 is flattened. Next, pads for electrodes (not shown) are formed on the overcoat layer 89. Finally, the slider including the foregoing layers is lapped to form the air bearing surface 90. The thin-film magnetic head including the read and write heads is thus completed.

The thin-film magnetic head according to the third embodiment comprises the air bearing surface 90 serving as a medium facing surface that faces toward a recording medium. The magnetic head further comprises the read head and the write head (the induction-type electromagnetic transducer).

The read head includes: the MR element 5 located near the air bearing surface 90; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. The portions of the bottom shield layer 3 and the top shield layer 8 located on a side of the air bearing surface 90 are opposed to each other with the MR element 5 disposed in between.

The write head comprises the bottom pole layer 70 and the top pole layer 77 that are magnetically coupled to each other and include the pole portions opposed to each other and located in the regions of the pole layers on the side of the air bearing surface 90. The write head further comprises: the write gap layer 75 disposed between the pole portion of the bottom pole layer 70 and the pole portion of the top pole layer 77; and the coils 81 and 85 provided such that at least part of each of the coils is disposed between the bottom pole layer 70 and the top pole layer 77 and insulated from the bottom pole layer 70 and the top pole layer 77. The bottom pole layer 70 and the top pole layer 77 of the present embodiment correspond to the first pole layer and the second pole layer of the invention, respectively.

Figure 25:
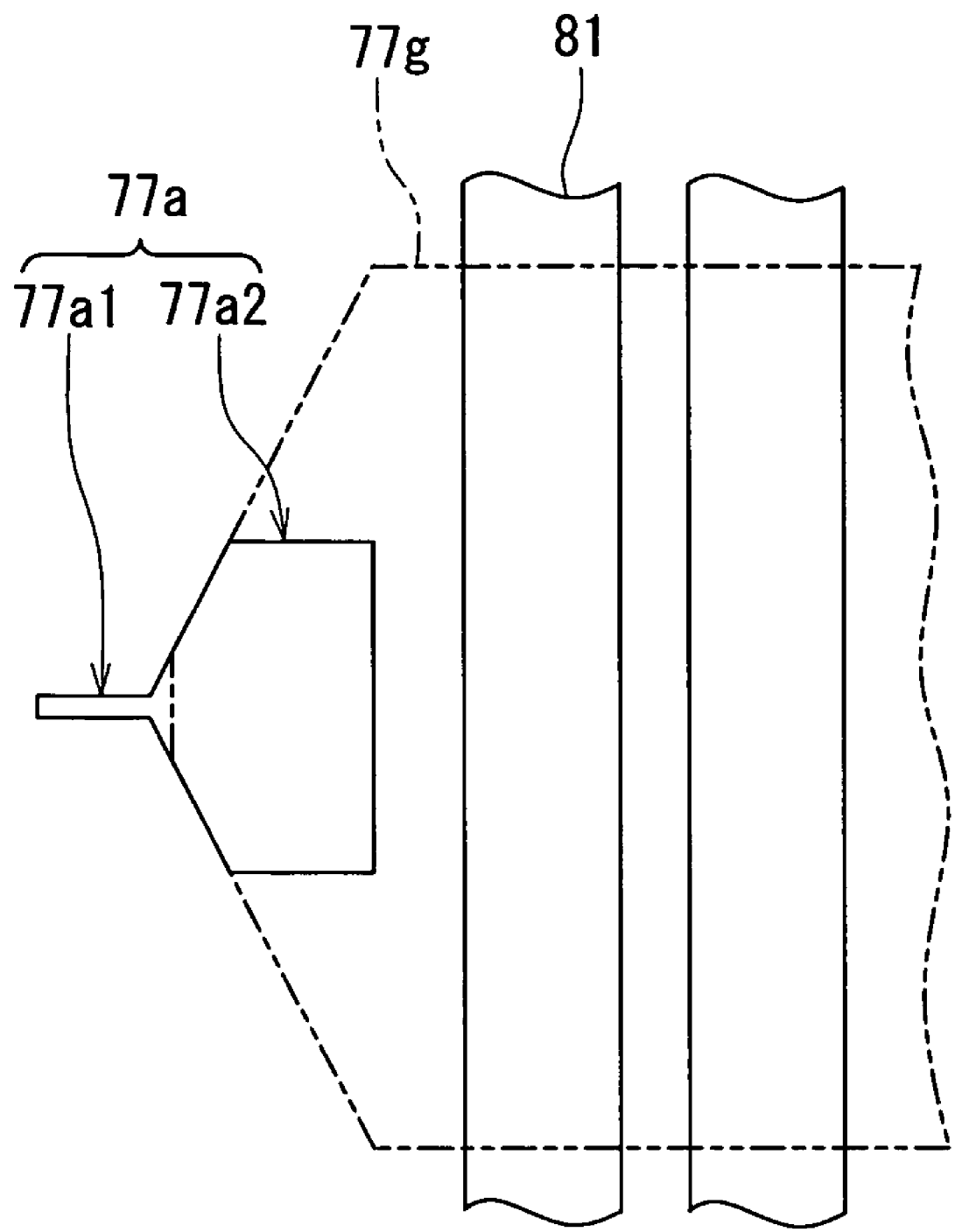
FIG. 25 is a top view for illustrating a first layer of the top pole layer of the thin-film magnetic head of FIG. 24A and FIG. 24B and the neighborhood thereof.

FIG. 25 is a top view illustrating the first layer 77a of the top pole layer 77 and the neighborhood thereof. As shown in FIG. 25, the first layer 77a includes a track width defining portion 77a1 and a wide portion 77a2. The track width defining portion 77a1 has an end located in the air bearing surface 90 and the other end opposite to the air bearing surface 90, and has a width equal to the write track width. The wide portion 77a2 is coupled to the other end of the track width defining portion 77a1 and has a width greater than the write track width. To be specific, the wide portion 77a2 is equal in width to the track width defining portion 77a1 at the interface with the track width defining portion 77a1. The wide portion 77a2 gradually increases in width as the distance from the track width defining portion 77a1 increases, and then maintains a specific width to the end. The first layer 77a corresponds to the track width defining layer of the invention. The track width defining portion 77a1 makes up the pole portion of the top pole layer 77. The second layer 70b of the bottom pole layer 70 has a portion opposed to the track width defining portion 77a1 with the write gap layer 75 disposed in between. This portion is the pole portion of the bottom pole layer 70.

The write track width is not limited to a specific value but preferably falls within a range of 0.05 to 0.15 µm inclusive to improve the recording density. The length of the track width defining portion 77a1 taken along the direction orthogonal to the air bearing surface 90 is not limited to a specific value but preferably falls within a range of 0.05 to 0.5 µm inclusive to improve the overwrite property, and more preferably falls within a range of 0.05 to 0.3 µm inclusive.

The step of forming the first layer 77a of the top pole layer 77 of the third embodiment will now be described in detail. The first layer 77a is formed through a method similar to the method of forming the second layer 27b of the top pole layer 27 of the first embodiment. That is, the step of forming the first layer 77a includes the steps of: forming a photoresist layer as the resist layer of the invention; exposing the photoresist layer to radiant energy such as light so as to form a latent image corresponding to the first layer 77a as the track width defining layer in the photoresist layer; forming a frame having a groove corresponding to the first layer 77a by developing the photoresist layer exposed; and forming the first layer 77a by frame plating using the frame.

The step of exposing the photoresist layer includes: a first exposure step of exposing the photoresist layer to radiant energy such as light so as to form a first latent image in the photoresist layer; and a second exposure step of exposing the photoresist layer to radiant energy such as light so as to form a second latent image in the photoresist layer, the second exposure step being performed before or after the first exposure step.

Figure 26:
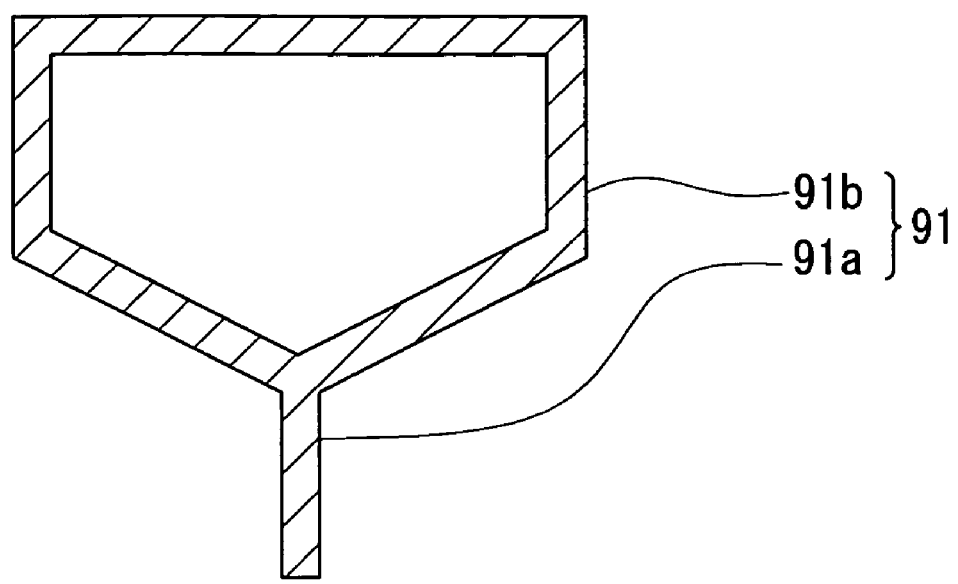
FIG. 26 illustrates a region in which radiant energy is applied to the photoresist layer in a first exposure step of the third embodiment.
Figure 27:
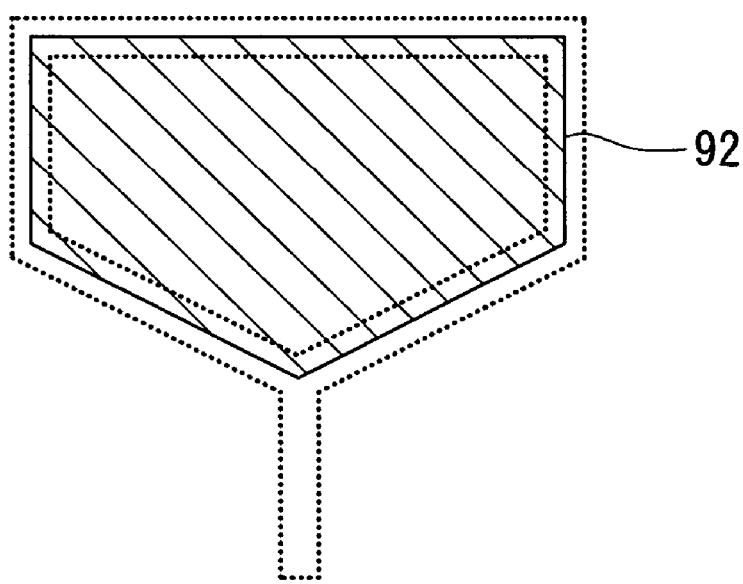
FIG. 27 illustrates a region in which radiant energy is applied to the photoresist layer in a second exposure step of the third embodiment.

FIG. 26 illustrates a region with hatching in which radiant energy is applied to the photoresist layer in the first exposure step. FIG. 27 illustrates a region with hatching in which radiant energy is applied to the photoresist layer in the second exposure step.

As shown in FIG. 26, in the first exposure step, radiant energy is applied to the region with hatching so that a first latent image 91 is formed in the photoresist layer. The first latent image 91 is made up of: a first portion 91a corresponding to the track width defining portion 77a1 of the first layer 77a; and a second portion 91b that adjoins the first portion 91a and extends along at least part of the contour of the wide portion 77a2 of the first layer 77a. FIG. 26 shows an example in which the second portion 91b extends along the entire contour of the wide portion 77a2. However, the second portion 91b may extend along part of the contour of the wide portion 77a2, as in the second embodiment.

The first portion 91a of the first latent image 91 may have a width equal to the write track width that falls within a range of 0.05 to 0.15 μm inclusive, for example, or may be slightly greater than the write track width. If the first portion 91a has a width greater than the write track width, the width of the track width defining portion 77a1 of the first layer 77a immediately after the track width defining portion 77a1 is formed by frame plating is greater than the write track width. Therefore, in this case, the sidewalls of the track width defining portion 77a1 are etched by ion beam etching, for example, to make the width of the track width defining portion 77a1 equal to a desired write track width.

The second portion 91b may have a width equal to or slightly greater than the width of the first portion 91a. For example, the second portion 91b may have a width that falls within a range of 0.15 to 0.3 μm inclusive.

As shown in FIG. 27, in the second exposure step, radiant energy is applied to the region with hatching so that a second latent image 92 is formed in the photoresist layer. In FIG. 27 the first latent image 91 formed in the first exposure step is shown by dotted lines.

The second latent image 92 is intended for use in combination with the first latent image 91 so as to form the latent image corresponding to the first layer 77a, and does not include a portion corresponding to the track width defining portion 77a1 of the first layer 77a. In the example shown in FIG. 27 the second latent image 92 has a geometry corresponding to the wide portion 77a2 of the first layer 77a except a portion near the contour of the wide portion 77a2. A portion of one of the first and second latent images 91 and 92 is overlaid on a portion of the other.

In the third embodiment the amount of radiant energy per unit area applied to the photoresist layer in the first exposure step is greater than the amount of radiant energy per unit area applied to the photoresist layer in the second exposure step. The amount of radiant energy per unit area may be controlled by adjusting the exposure period.

According to the embodiment, each of the first and second exposure steps is performed under an appropriate condition, and the first layer 77a that defines the track width is thereby formed with accuracy. According to the embodiment, the flat first layer 77a is formed on the flat surface. These features of the embodiment allow the track width defining portion 77a1 to have reduced dimensions and to be formed with accuracy. As a result, it is possible to reduce the track width and to improve the recording density.

The remainder of configuration, function and effects of the third embodiment are similar to those of the first embodiment.

The present invention is not limited to the foregoing embodiments but may be practiced in still other ways. For example, the thin-film coil including the stacked two-layer coils 81 and 85 is employed in the third embodiment. However, the thin-film coil of the first embodiment may be used in the third embodiment. In this case, the fifth layer 77e and the sixth layer 77f of the top pole layer 77 are not required.

The invention is also applicable to a thin-film magnetic head dedicated to writing that has an induction-type electromagnetic transducer only, or a thin-film magnetic head that performs writing and reading with an induction-type electromagnetic transducer.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head, the head comprising:

a medium facing surface that faces toward a recording medium;

a first pole layer and a second pole layer that are magnetically coupled to each other and that include magnetic pole portions opposed to each other and located in regions of the pole layers on a side of the medium facing surface;

a gap layer provided between the pole portion of the first pole layer and the pole portion of the second pole layer; and a thin-film coil, at least part of the coil being disposed between the first and second pole layers and insulated from the first and second pole layers, wherein:

one of the pole layers incorporates a track width defining layer; and the track width defining layer includes: a track width defining portion having an end located in the medium facing surface and the other end located opposite to the medium facing surface; and a wide portion coupled to the other end of the track width defining portion and having a width greater than a track width, the method comprising the steps of:

forming the first pole layer;

forming the thin-film coil on the first pole layer;

forming the gap layer on the pole portion of the first pole layer; and forming the second pole layer on the gap layer, wherein:

the step of forming one of the pole layers includes the step of forming the track width defining layer;

the step of forming the track width defining layer includes the steps of:

forming a resist layer;

exposing the resist layer to radiant energy so as to form a latent image corresponding to the track width defining layer in the resist layer;

forming a frame having a groove corresponding to the track width defining layer by developing the resist layer exposed; and forming the track width defining layer by plating using the frame;

the step of exposing the resist layer includes:

a first exposure step of exposing the resist layer to radiant energy so as to form a first latent image in the resist layer; and a second exposure step of exposing the resist layer to radiant energy so as to form a second latent image in the resist layer, the second exposure step being performed before or after the first exposure step;

the first latent image is made up of a first portion corresponding to the track width defining portion and a second portion adjoining the first portion and extending along at least part of a contour of the wide portion; and the second latent image is intended for use in combination with the first latent image so as to form the latent image corresponding to the track width defining layer, and does not include a portion corresponding to the track width defining portion.

2. The method according to claim 1, wherein an amount of radiant energy per unit area applied to the resist layer in the first exposure step is greater than an amount of radiant energy per unit area applied to the resist layer in the second exposure step.

3. The method according to claim 1, wherein a portion of one of the first and second latent images is overlaid on a portion of the other.

4. The method according to claim 1, wherein:
the first pole layer defines a throat height; and
the second pole layer incorporates the track width defining layer.

5. The method according to claim 4, wherein the track width defining layer is disposed on the gap layer that is flat.

6. The method according to claim 1, wherein the track width falls within a range of 0.05 to 0.15 µm inclusive.

7. The method according to claim 1, wherein a length of the track width defining portion taken along a direction orthogonal to the medium facing surface falls within a range of 0.05 to 0.5 µm inclusive.

* * * * *

UNITED STATES PATENT AND TRADEMARK OFFICE
CERTIFICATE OF CORRECTION

PATENT NO.        : 7,141,357 B2
APPLICATION NO. : 10/786048
DATED             : November 28, 2006
INVENTOR(S)       : Yoshitaka Sasaki, Kazuo Ishizaki and Takehiro Kamigama Page 1 of 1

It is certified that error appears in the above-identified patent and that said Letters Patent is hereby corrected as shown below:

Title page,
Item [73] Please change first Assignee "Headway Technologies, Ltd." to
--Headway Technologies, Inc.--.

Signed and Sealed this

Fifteenth Day of September, 2009

David J. Kappos
*Director of the United States Patent and Trademark Office*